United States Patent
Harada et al.

(10) Patent No.: US 10,154,430 B2
(45) Date of Patent: Dec. 11, 2018

(54) RADIO BASE STATION, USER TERMINAL AND RADIO COMMUNICATION SYSTEM

(71) Applicant: NTT DOCOMO, INC., Tokyo (JP)

(72) Inventors: Hiroki Harada, Tokyo (JP); Kazuki Takeda, Tokyo (JP); Satoshi Nagata, Tokyo (JP); Mingju Li, Beijing (CN); Jing Wang, Beijing (CN); Yu Jiang, Beijing (CN); Liu Liu, Beijing (CN); Huiling Jiang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 25 days.

(21) Appl. No.: 15/325,615

(22) PCT Filed: Jun. 24, 2015

(86) PCT No.: PCT/JP2015/068211
§ 371 (c)(1),
(2) Date: Jan. 11, 2017

(87) PCT Pub. No.: WO2016/006450
PCT Pub. Date: Jan. 14, 2016

(65) Prior Publication Data
US 2017/0156075 A1    Jun. 1, 2017

(30) Foreign Application Priority Data
Jul. 11, 2014  (JP) .................................. 2014-143510

(51) Int. Cl.
*H04W 16/14*    (2009.01)
*H04W 24/10*    (2009.01)
(Continued)

(52) U.S. Cl.
CPC .......... *H04W 24/10* (2013.01); *H04B 17/318* (2015.01); *H04W 16/14* (2013.01);
(Continued)

(58) Field of Classification Search
CPC ... H04W 24/10; H04W 74/006; H04W 16/14; H04W 36/0069; H04W 36/00;
(Continued)

(56) References Cited

U.S. PATENT DOCUMENTS

2010/0069013 A1   3/2010  Chaudhri et al.
2011/0305159 A1*  12/2011  Hofmann ............ H04W 72/085
                                                    370/252

(Continued)

FOREIGN PATENT DOCUMENTS

WO    2012040520 A1    3/2012
WO    2013155672 A1   10/2013

OTHER PUBLICATIONS

International Search Report issued in PCT/JP2015/068211, dated Aug. 11, 2015 (2 pages).

(Continued)

*Primary Examiner* — Ian N Moore
*Assistant Examiner* — Brian T Le
(74) *Attorney, Agent, or Firm* — Osha Liang LLP

(57) ABSTRACT

In order to prevent, in an LAA system supporting LBT, reduction in resource usage of the system, the present invention provides a radio base station that communicates with a user terminal capable of using a licensed band and unlicensed band. The radio base station comprises: an obtaining section that obtains information about an available time resource amount that is determined based on a result of LBT (Listen Before Talk) in the unlicensed band; and a control section that controls communication with the user terminal in the unlicensed band based on the information about the available time resource amount.

3 Claims, 19 Drawing Sheets

(51) Int. Cl.
| | |
|---|---|
| *H04W 36/00* | (2009.01) |
| *H04W 48/16* | (2009.01) |
| *H04W 72/14* | (2009.01) |
| *H04W 74/00* | (2009.01) |
| *H04W 74/08* | (2009.01) |
| *H04W 84/12* | (2009.01) |
| *H04B 17/318* | (2015.01) |

(52) U.S. Cl.
CPC ....... *H04W 36/00* (2013.01); *H04W 36/0069* (2018.08); *H04W 74/006* (2013.01); *H04W 74/0808* (2013.01); *H04W 48/16* (2013.01); *H04W 72/14* (2013.01); *H04W 84/12* (2013.01)

(58) Field of Classification Search
CPC . H04W 74/0808; H04W 48/16; H04W 72/14; H04W 84/12; H04B 17/318
See application file for complete search history.

(56) References Cited

U.S. PATENT DOCUMENTS

| | | | | |
|---|---|---|---|---|
| 2012/0250562 A1* | 10/2012 | Li | ......................... | H04W 24/10 370/252 |
| 2013/0059614 A1* | 3/2013 | Kannan | ................. | H04W 72/06 455/500 |
| 2013/0163449 A1 | 6/2013 | Flammer, III | | |
| 2013/0163499 A1 | 6/2013 | Cheng et al. | | |
| 2013/0294356 A1 | 11/2013 | Bala et al. | | |
| 2015/0245358 A1* | 8/2015 | Schmidt | .............. | H04L 43/0888 370/329 |
| 2016/0374092 A1* | 12/2016 | Gao | .................. | H04W 72/0486 |

OTHER PUBLICATIONS

Written Opinion of the International Searching Authority issued in PCT/JP2015/068211, dated Aug. 11, 2015 (3 pages).

3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).

Office Action issued in the counterpart Japanese Patent Application No. 2016-532865, dated May 30, 2017 (12 pages).

Takeo Fujii et al.; "A Study of MAC Protocol for Cognitive Radio Systems"; IEICE Technial Report, Japan, the Institute of Electronics, Information and Communication Engineers; Feb. 23, 2011, vol. 110, No. 435, pp. 23-30 (9 pages).

Extended European Search Report issued in the counterpart European Patent Application No. 15819524.8, dated Jan. 12, 2018 (9 pages).

* cited by examiner

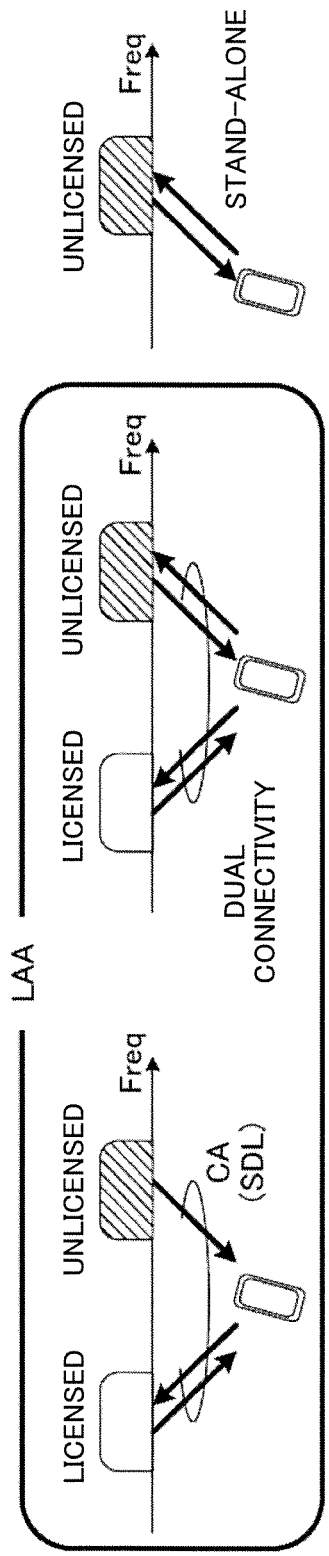

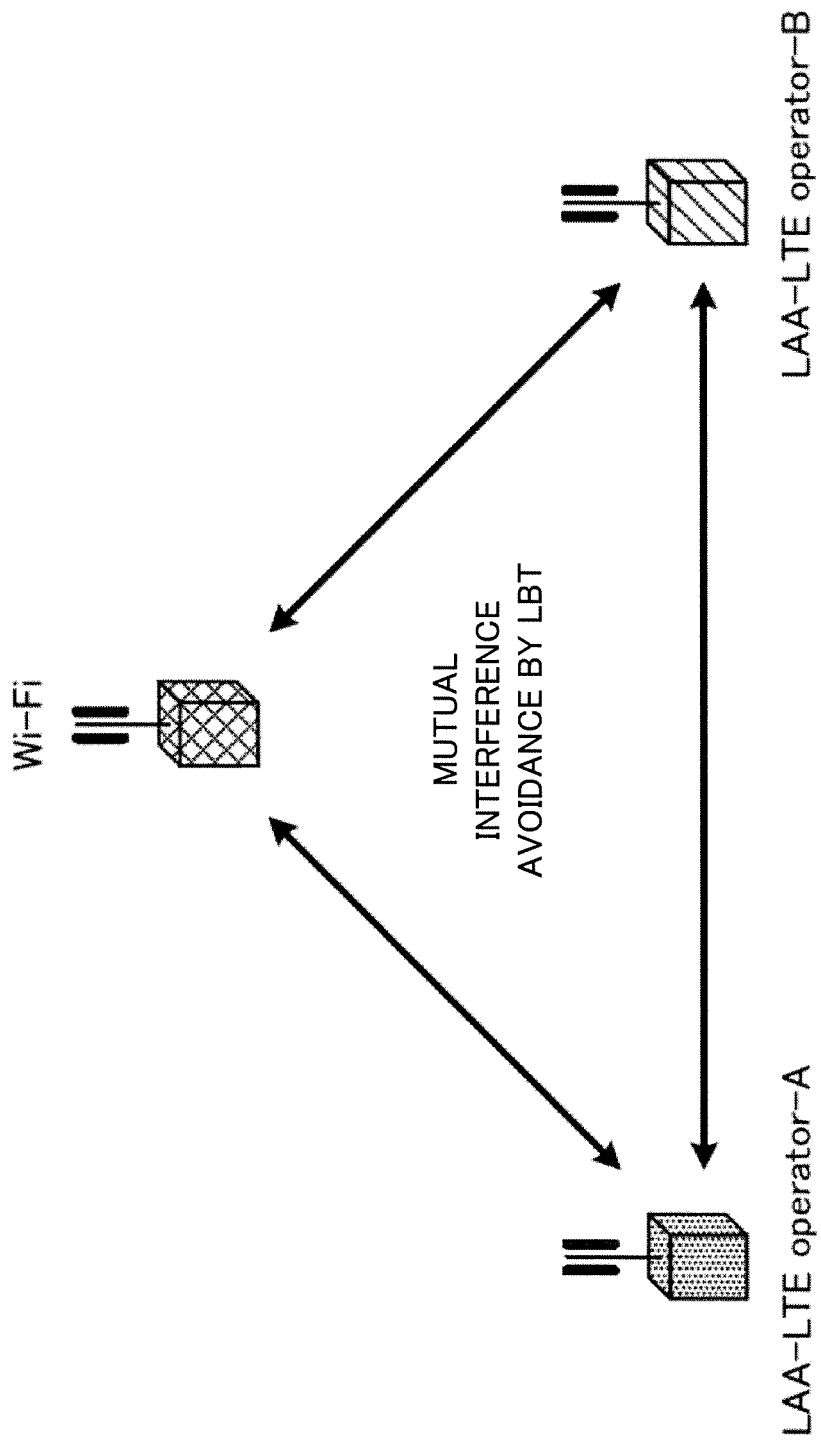

RADIO BASE STATION, USER TERMINAL AND RADIO COMMUNICATION SYSTEM

TECHNICAL FIELD

The present invention relates to a radio base station, a user terminal and a radio communication system in next-generation mobile communication systems.

BACKGROUND ART

In a UMTS (Universal Mobile Telecommunications System) network, for the purposes of achieving higher-speed data rates, providing low delay and so on, long-term evolution (LTE) has been standardized (see Non Patent Literature 1). In LTE, as multi access schemes, an OFDMA (Orthogonal Frequency Division Multiple Access)-based scheme is used for downlink and an SC-FDMA (Single Carrier Frequency Division Multiple Access)-based scheme is used for uplink. For the purposes of achieving further broadbandization and higher speed, successor systems to LTE have been also studied and standardized (Rel. 10/11) (for example, such a system is also called "LTE advanced" or "LTE enhancement" (hereinafter referred to as "LTE-A")).

In the LTE-A system, HetNet (Heterogeneous Network) has been also studied in which a macro cell is formed having a wide coverage area of about several kilo meter radius, and a small cell (for example, pico cell, femto cell or the like) having a local coverage area of about several ten meter radius is formed within the macro cell. In the HetNet environment, it has been considered that the macro cell (macro base station) and the small cell (small base station) use not only carriers of the same frequency band but also carriers of different frequency bands.

Further, in a future radio communication system (Rel. 12 or later), the LTE system has been considered as operating not only in a licensed frequency band but also in an unlicensed frequency band (license-not-required frequency band) (which system is called LTE-U: LTE Unlicensed). When the LTE-U is operated on the basis of cooperation of the licensed band LTE (Licensed LTE), it is called LAA (Licensed-Assisted Access) or LAA-LTE. A system operating LTE/LTE-A in the unlicensed band is sometimes called "LAA" collectively.

The licensed band is a band that is permitted to be used exclusively by a specific operator (carrier), while the unlicensed band (also called "non-licensed band") is a band in which a radio base station is able to be installed without restriction to a specific operator. As the unlicensed band, a 2.4 GHz or 5 GHz band, in which Wi-Fi (registered trademark) and Bluetooth (registered trademark) is usable, and a 60 GHz band, in which milli-meter wave is usable, have been considered to be used. This unlicensed band has been also considered to be applied to a small cell.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2

SUMMARY OF THE INVENTION

Technical Problem

In the LAA system, there is need to operate the system in consideration of mutual interference with a Wi-Fi system or any other systems operating in the unlicensed band and an LTE-U system of another operator. Then, in order to avoid the mutual interference, it has been considered that an LTE-U base station/user terminal performs listening before signal transmission to determine if another base station/user terminal is in communication. This listening operation is called LBT (Listen Before Talk).

For data transmission and reception, the user terminal needs to be connected to an appropriate cell. However, in the case where each LAA system carries out LBT, if the cell selection method in the conventional LTE system premised on the licensed band is used, an inappropriate cell is selected in the unlicensed band, which may cause reduction in the resource usage of the system.

The present invention was carried out in view of the foregoing and aims to provide a radio base station, a user terminal and a radio communication system that are capable of, in an LAA system supporting LBT, preventing reduction of resource usage of the LAA system.

Solution to Problem

The present invention provides a radio base station that communicates with a user terminal capable of using a licensed band and unlicensed band, the radio base station comprising: an obtaining section that obtains information about an available time resource amount that is determined based on a result of LBT (Listen Before Talk) in the unlicensed band; and a control section that controls communication with the user terminal in the unlicensed band based on the information about the available time resource amount.

Technical Advantage of the Invention

According to the present invention, it is possible to, in an LAA system supporting LBT, suppress reduction in resource usage of the system.

BRIEF DESCRIPTION OF THE DRAWINGS

FIG. 2 provides diagrams each illustrating an example of scenario using LTE in unlicensed band;

FIG. 3 is a diagram illustrating avoidance of interference of the LAA system and Wi-Fi system by LBT;

DESCRIPTION OF EMBODIMENTS

Figure 1:
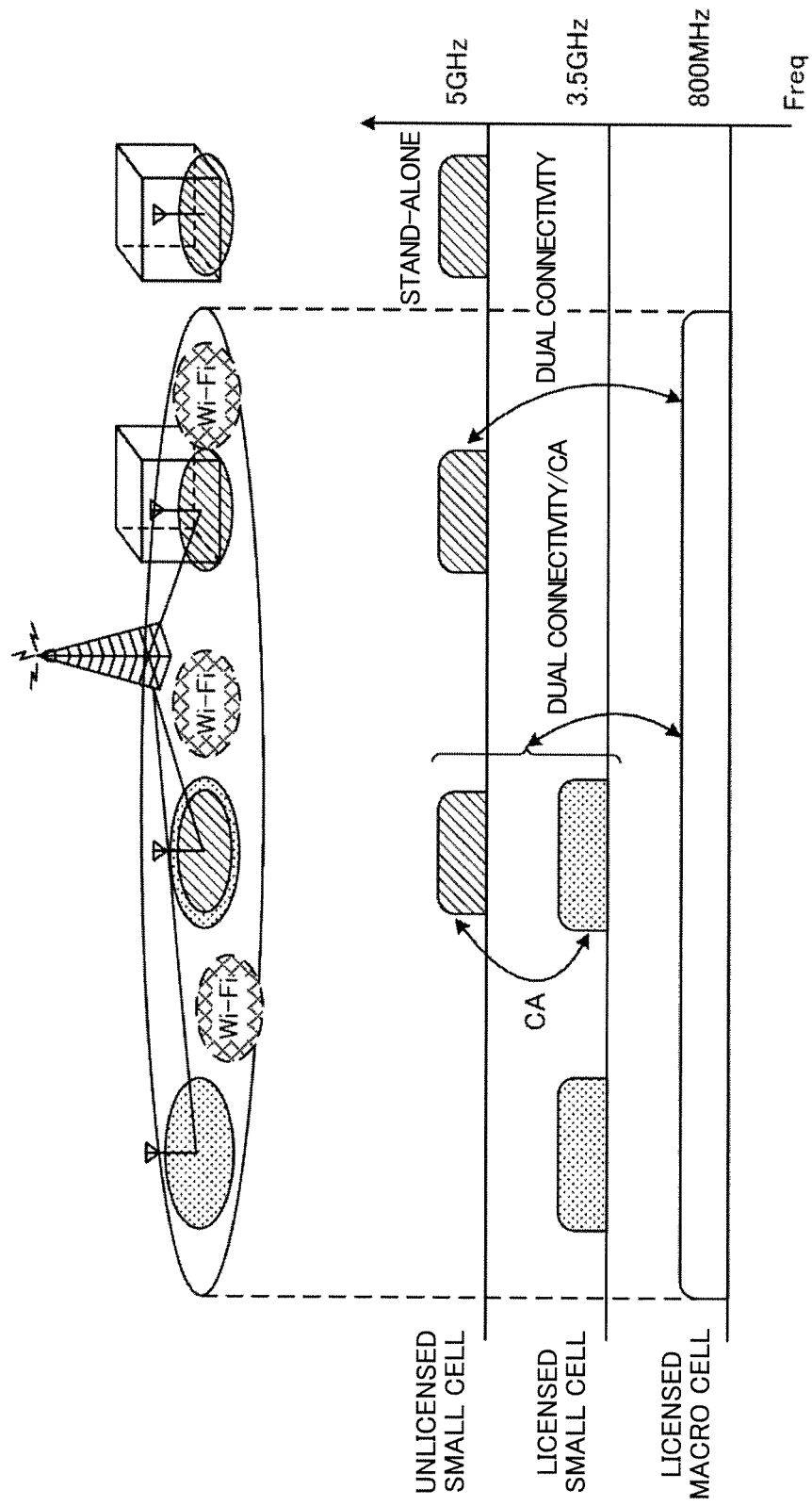
FIG. 1 is a diagram illustrating an example of a radio communication system using LTE in the unlicensed band.

FIG. 1 illustrates an example of an embodiment of a radio communication system operating LTE in the unlicensed band (LTE-U). As illustrated in FIG. 1, there are expected a plurality of scenarios for using LTE in unlicensed band, such as carrier aggregation (CA), dual connectivity (DC) and stand-alone.

As an example, assume a macro cell using a licensed band (for example, 800 MHz band), a small cell using a licensed band (for example, 3.5 GHz band) and a small cell using an unlicensed band (for example, 5 GHz band). When CA is applied to cells, their coverage areas are arranged overlapping at least in part. In addition, the coverage area of Wi-Fi system is located as overlapping a part of the coverage area of the macro cell and/or small cell.

In this case, there is expected to be a scenario that CA or DC applies to the macro cell using the licensed band (Licensed macro cell), the small cell using the licensed band (Licensed small cell) and the small cell using the unlicensed band (Unlicensed small cell). For example, it is expected that CA applies to between the macro cell using the licensed band, the small cell using the licensed band and the small cell using the unlicensed band.

There is expected to be another scenario that CA applies to between the small cell using the licensed band and the small cell using the unlicensed band. In yet another scenario, it is expected that CA or DC applies to the macro cell using the licensed band the small cell using the unlicensed band.

Each of these scenarios will be described with reference to FIG. 2. FIG. 2 provides diagrams each illustrating an example of the scenario operating the LTE in the unlicensed band. Application of the present invention is not limited to the scenarios illustrated in FIG. 2.

FIG. 2A illustrates the scenario where carrier aggregation (CA) applies using licensed and unlicensed bands. FIG. 2B illustrates the scenario where dual connectivity (DC) applies using licensed and unlicensed bands. FIG. 2C illustrates the scenario where stand-alone applies using a unlicensed band.

A radio base station supporting LTE with unlicensed band is also referred to as LTE-U base station.

Carrier Aggregation (CA) illustrated in FIG. 2A represents broadbandization by aggregating a plurality of component carriers (component carrier is also called CC, carrier, cell or the like). Each CC has, for example, a band of maximum 20 MHz, and for example, maximum five CCs are aggregated into a maximum 100 MHz band.

When CA applies, a scheduler of one radio base station controls scheduling of a plurality of CCs. Accordingly, CA may be called intra-eNB CA. Besides, in FIG. 2A, the unlicensed band may be used as a supplemental downlink (SDL) (no UL carrier is configured). Here, SDL represents a carrier dedicated for DL transmission.

In the present embodiment, it may be configured that licensed and unlicensed bands are transmitted and received (co-located) by one transmission/reception point (for example, radio base station). In this case, the transmission/reception point (for example, LTE/LTE-U base station is able to use both of licensed and unlicensed bands in performing communication with a user terminal. Or, it may be configured that licensed and unlicensed bands are transmitted and received (non-co-located) by different transmission points (for example, one is a radio base station and the other is a Remote Radio Head (RRH) connected to the radio base station).

Dual connectivity (DC) illustrated in FIG. 2B is similar to CA in that a plurality of CCs are aggregated into broadbandization. When DC applies, a plurality of schedulers are provided independently, and each of the schedulers is configured to control scheduling of one or more cells (CCs) managed by the scheduler. Accordingly, DC may be called inter-eNB CA. For example, in DC, DL signals using licensed and unlicensed bands are transmitted from different transmission points (for example, different radio base stations). In DC, carrier aggregation (intra-eNB CA) may be applied per scheduler (radio base station) provided independently.

In the stand-alone illustrated in FIG. 2C, a cell supporting LTE-U operation with the unlicensed band (LTE-U base station) is configured to operate alone. Here, stand-alone means that communication with a user terminal is able to be realized without application of CA or DC. In this case, the user terminal is able to initially connect to the LTE-U base station. Therefore, in the stand-alone operation mode, there is expected to be a scenario that a user (for example, individual) except for operators may establish a LTE-U base station (access point).

In addition, in the CA/DC operation modes illustrated in FIGS. 2A and 2B, for example, it may be configured that the licensed band CC is used as a primary cell (PCell) and the unlicensed band is used as a secondary cell (SCell). Here the primary cell (PCell) is a cell that manages RRC connection and handover in performing CA/DC, and it needs UL transmission to receive data and feedback signals from terminals. The primary cell is always configured in both of uplink and downlink. The secondary cell (SCell) is another cell that is configured in addition to the primary cell when CA/DC applies. The secondary cell may be able to configured only in downlink or may be configured in uplink and downlink simultaneously.

As illustrated in FIG. 2A (CA) and FIG. 2B (DC), the LTE-U operation mode assuming LTE of Licensed band (licensed LTE) is available may be called LAA (Licensed-Assisted Access) or LAA-LTE. In LAA, the licensed LTE and unlicensed LTE cooperates to communicate with the user terminal.

In LAA, when a transmission point (for example, radio base station) using the licensed band and a transmission point using the unlicensed band are apart from each other, they may be connected by backhaul link (for example, optical fiber, X2 interface, or the like).

The existing LTE is premised on operation with the licensed band. Accordingly, operators are assigned mutually different frequency bands. On the other hand, as for the unlicensed band, its use is not limited to specific operators, unlike the licensed band. Accordingly, the frequency band used in LTE-U by a certain operator may overlap a frequency band used in LAA system or Wi-Fi system by another operator.

When operating LTE with the unlicensed band, it may be assumed that LTE is operated between different operators or non-operators without synchronization, coordination and/or cooperation. In this case, in the unlicensed band, a plurality of operators or systems are to share the same frequency, which may cause mutual interference.

Then, in the Wi-Fi system operated with the unlicensed band, resources are allocated in such a manner that whole the band is dedicated for a specific user in a given period. Accordingly, in Wi-Fi, in order to avoid collision of transmission signals between user terminals, access points and so on, there has been adopted Carrier Sense Multiple Access/Collision Avoidance (CSMA/CA) based on Listen Before Talk (LBT) mechanism.

Specifically, there is used one method of executing listening (CCA: Clear Channel Assessment) before transmission by each transmission point (TP), access point (AP) or Wi-Fi terminal (STA: Station), and carrying out DL transmission only when there is no signal that exceeds a predetermined level. When reception power measured by LBT exceeds a given threshold, it is determined that the channel is busy and transmission is not carried out. On the other hand, the reception power measured by LBT is equal to or less than the given threshold, it is determined that the channel is clear and transmission is carried out. In other words, the condition that "the channel is clear" means the channel is not occupied by any given system.

From this, LBT is expected to become necessary in LTE/LTE-A system (for example, LAA system) operating with the unlicensed band. FIG. 3 is a diagram illustrating an example of interference avoidance of the LAA system and Wi-Fi system by LBT. FIG. 3 illustrates the Wi-Fi system, the LAA system of an operator A and the LAA system of an operator B. It is assumed that each LAA system uses LBT.

When the LBT is introduced into the LAA system, it is possible to avoid interference between the LAA and Wi-Fi systems. It is also possible to avoid interference between the LAA systems. Even when the operators A and B independently control user terminals that are connectable to the respective operators, it is possible to reduce interference by LBT without need to know their respective control contents.

When the listening results in that no signal is detected from another system or LAA transmission point, the unlicensed band establishes communication with a user terminal. On the other hand, when the listening results in that a signal is detected from another system or LAA transmission point, the processing is performed such as (1) transition to another carrier by DFS (Dynamic Frequency Selection), (2) transmit power control (TPC), (3) stand (stop) transmission, and so on.

Figure 4B:
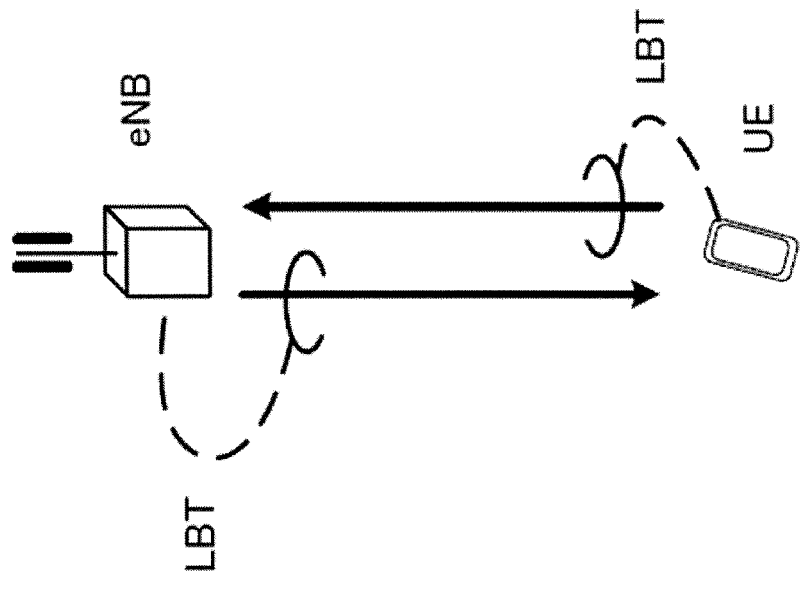
FIG. 4 provides diagrams for explaining the operation entity of LBT in the LAA system.
Figure 4A:
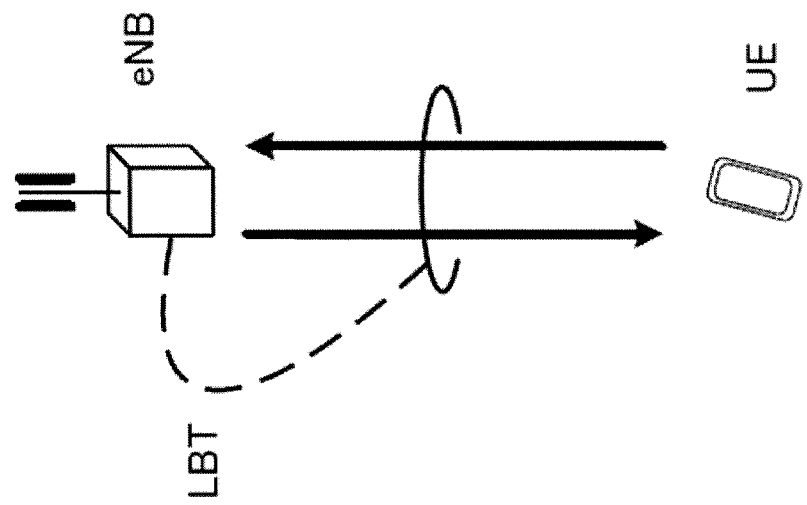

FIG. 4 provides diagrams each for explaining the measuring entity by LBT in the LAA system. In FIG. 4, a radio base station (eNB) forming the unlicensed band, a user terminal (UE) and downlink (DL)/uplink (UL) between eNB and UE are illustrated. In the unlicensed band cell, listening (LBT) is performed before signal transmission, and it is determined whether or not another system (for example, Wi-Fi) or LAA (LTE-U) transmission point performs communication. FIG. 4A illustrates an example where eNB performs LBT in both of DL and UL. In this case, after eNB determines that the channel is clear, eNB transmits a given signal (for example, UL grant) to UE so that UE can transmit UL. On the other hand, FIG. 4B illustrates an example where the transmission side carries out LBT. In this case, for DL transmission, eNB carries out LBT and for UL transmission, UE carries out LBT.

Figure 5:
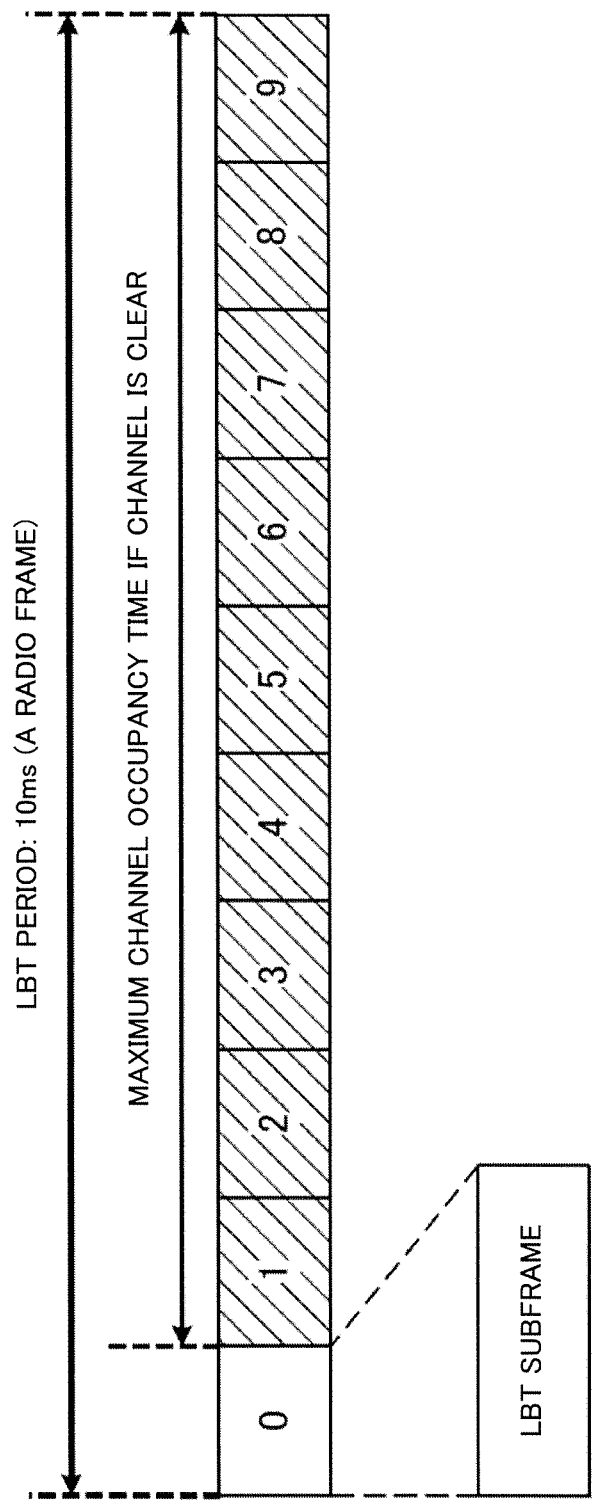
FIG. 5 is a diagram illustrating an example of the LAA frame configuration based on LBT.

FIG. 5 is a diagram illustrating an example of the LAA frame configuration based on LBT. In the frame, LBT is executed only during a given period (also called LBT period, LBT time or the like). In FIG. 5, LBT's size (LBT period in a frame) is 1 subframe (1 ms). Here, the subframe corresponding to the LBT period may be called LBT subframe. Here, the frame length of LBT based LAA (also called "LBT period") is preferably 10 ms like a conventional radio frame. Further, the above-mentioned LBT size or LBT period may be other values than those mentioned in FIG. 5.

In the frame configuration of FIG. 5, for example, eNB performs LBT in the LBT subframe, checks whether the channel is clear or not and determines that transmission is enabled or not. With this determination, it is determined how long time resource is clear. Specifically, the maximum channel occupancy time when the channel is clear (also called "channel occupiable time") is a residual time other than the LBT period in the frame, and in FIG. 5, the maximum channel occupancy time is 9 ms. The channel occupancy time does not depend on the size of a packet to transmit.

Figure 6A:
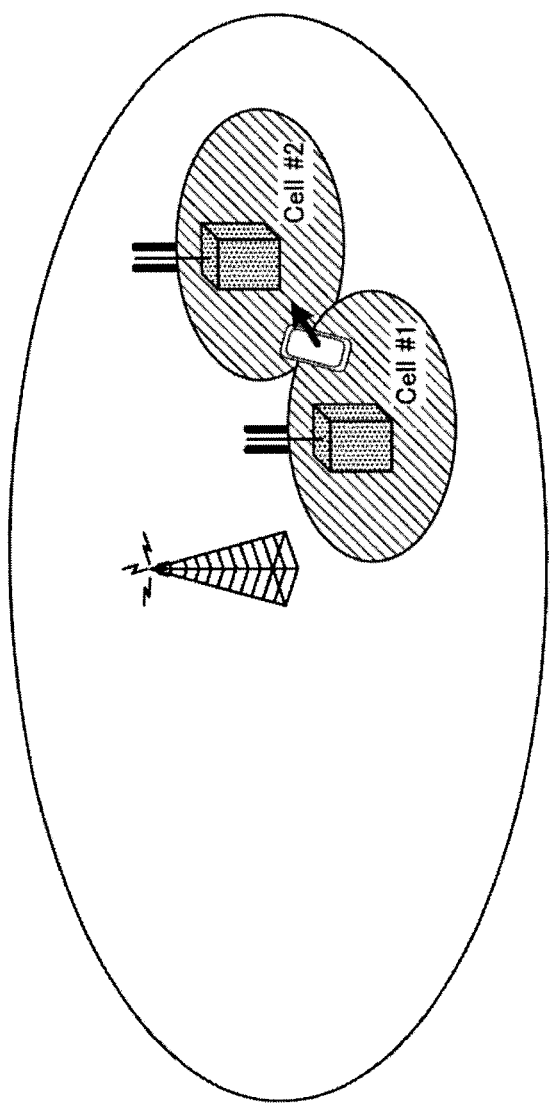
FIG. 6 provides diagrams illustrating an example of use case of cell selection.

Here, in the conventional LTE cell selection, eNB selects the best cell for UE in a given frequency band. The best cell can be determined to be a cell of highest index where each cell is given a predetermined index. FIG. 6 provides diagrams illustrating a use case of cell selection. FIG. 6A illustrates two small cells (Cell #1, Cell #2) included in an area of a macro cell and the user terminal moves from Cell #1 to Cell #2. Cell selection of a primary cell (for example, macro cell) is executed by intra-frequency or inter-frequency handover. Cell selection of a secondary cell (for example, small cell) in CA or DC is executed by SCell replacement. In the example shown in FIG. 6A, the secondary cell is changed from Cell #1 to Cell #2, while the primary cell is not changed.

For example, cell selection in conventional LTE is executed in consideration of the following parameters: (1) signal strength or signal quality (for example, RSRP (Reference Signal Received Power), RSRQ (Reference Signal Received Quality)), (2) traffic load (for example, resource usage (RU) and (3) bandwidth (BW). Generally, as for (1) and (3), higher index is better, and as for (2), smaller index is better.

In view of these parameters, index to determine the best cell may use the capacity C given by the following equation (1).

$$C = BW \cdot (1-RU) \cdot \log_2 \cdot (1+SINR) \qquad \text{Equation (1)}$$

Figure 6B:
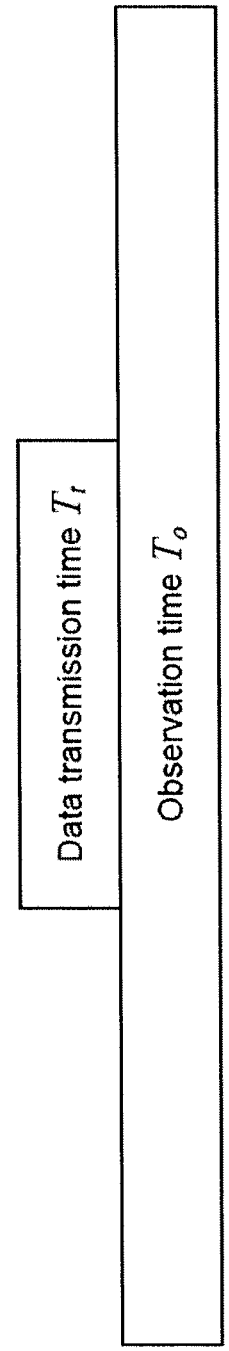

Here, BW is a bandwidth, SINR is a ratio of signal power to noise power (Signal-to-Interference plus Noise Ratio), RU denotes a resource usage. RU varies depending on the traffic amount or the number of users, and is determined by a ratio of data transmission time $T_t$ that occupies a given observation time $T_o$. FIG. 6B illustrates an example of the relationship between $T_t$ and $T_o$.

The above-mentioned "C" is obtained for each of a plurality of cells and a cell of the greatest C is determined to be the best cell. Here, besides "C", a cell having the maximum RSRP or cell having the minimum RU may be determined to be the best cell.

Thus, cell selection of the licensed band is performed on the precondition that resources are always available, and does not consider "time resources available for the cell".

However, the time resources actually available by the LAA cell corresponds to the channel occupiable time where it is determined that channel is clear as a result of LBT. That is, this "available time resource amount" differs per cell. In addition, this time resource amount is not relevant to RSRP, RU, or the like of the cell.

Figure 7:
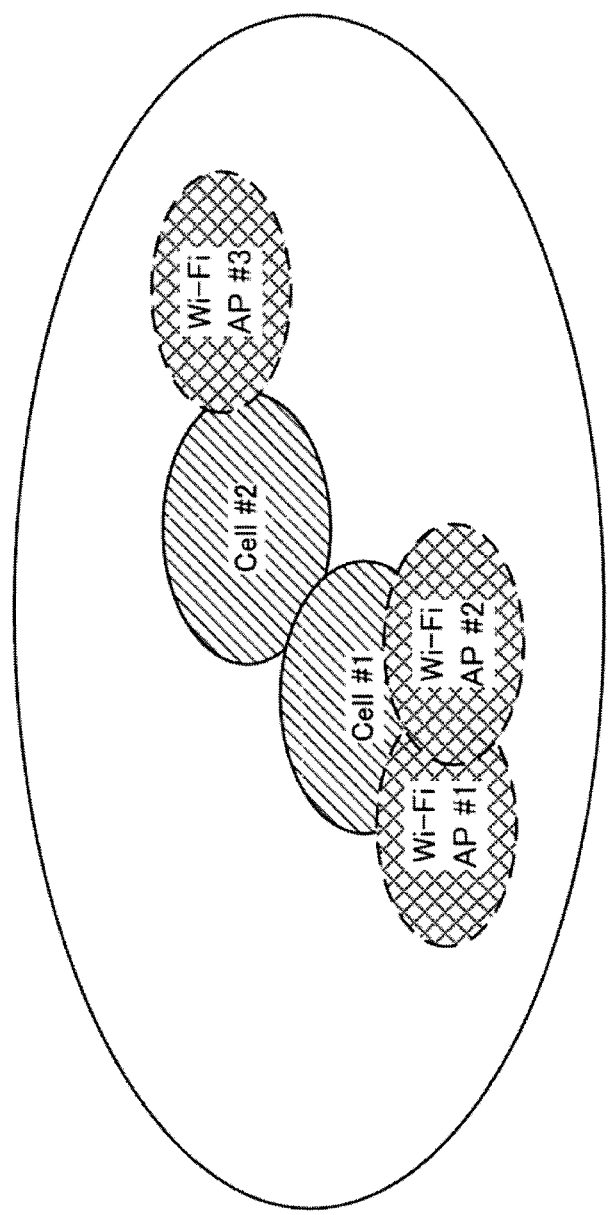
FIG. 7 is a diagram illustrating an example of arrangement of LAA cell and Wi-Fi coverage areas.

FIG. 7 is a diagram illustrating an example of arrangement of LAA cell and Wi-Fi coverage areas. Cell #1 and Cell #2 in FIG. 7 are LAA cells provided by the same operator. In vicinity of Cell #1, there are two Wi-Fi access points (Wi-Fi AP #1, #2), and one more Wi-Fi access point (Wi-Fi AP #3) is located at some distance from Cell #2.

In this case, since interference by Wi-Fi is greater in Cell #1 than in Cell #2, the time resource amount available for LAA cell is smaller in Cell #1 than in Cell #2. Accordingly, even when Cell #1 provides higher reception quality and lower RU, if the clear channel time is less, Cell #2 is preferable as a connection cell. However, when using the conventional index for cell selection (for example, equation (1)), Cell #1 is to be selected.

Thus, in the case where each LAA system executes LBT, if the cell selection for licensed band-based conventional LTE system is used, an appropriate cell may be selected in the unlicensed band, which causes reduction in resource usage of the system.

Then, the inventors of the present invention have noted that when the user terminal is connected to the licensed band and unlicensed band (LAA), cell selection is performed in consideration of information about the time resource amount available by the LAA cell. Specifically, they have found that an index indicating the time resource amount available as a new parameter to use for cell selection (CCR: Channel Clear Ratio) is introduced and a cell of higher CCR is selected preferentially.

CCR is an index reflecting the coexistence including other peripheral systems in the unlicensed band. According to the present invention, even when LBT is adopted in the unlicensed band, CCR is exchanged between eNBs thereby to be able to realize appropriate cell selection. As a result, for example, it is possible to avoid a cell near which there are located many other communicating systems and to select a cell having a higher percentage of available time resource. That is, in the LTE system in the unlicensed band, it is possible to realize more appropriate connection cell selection and to improve resource usage, throughput, user experience quality, and so on.

Here, with reference to the accompanying drawings, embodiments of the present invention will be described in detail below. In the following description, it is assumed that LBT is used in the LTE-U operating mode (LAA) where the licensed band is expected to be available, but such a case is merely an example and is not intended to limit the present invention.

In the present invention, cell selection is performed in consideration of CCR that is an index indicating the available time resource amount. CCR is measured and held by radio base stations and/or user terminals. Then, cell selection index is determined such that a cell of higher CCR is a better connection cell. For example, the capacity C in the equation (1) is obtained using CCR, as given by the equation (2).

$$C = BW \cdot (1-RU) \cdot CCR \cdot \log_2(1+SINR) \quad \text{Equation (2)}$$

Here, CCR according to the present invention is an index calculated based on occupation of the clear channel time within the given time, and is defined by the following equation (3).

$$CCR = \text{channel clear time/observation time} \quad \text{Equation (3)}$$

The observation time (also called "monitoring period", "measuring period", "CCR sample rate" or the like) indicates a time to observe or monitor where LBT is executed and is, for example, a total time of a plurality of radio frames each having an LBT subframe. In addition, the channel clear time (also called, "channel clear period", "clear period", "empty period" or the like) is a time where the channel is determined to be clear within the observation time. For example, when the reception power measured by LBT is equal to or less than a given threshold, it can be determined that the channel is clear. Here, CCR is given by the equation (3) in the present embodiment, but is not limited to this. CCR may be any index that indicates available time resource amount and may be defined by other than the equation (3).

Figure 8:
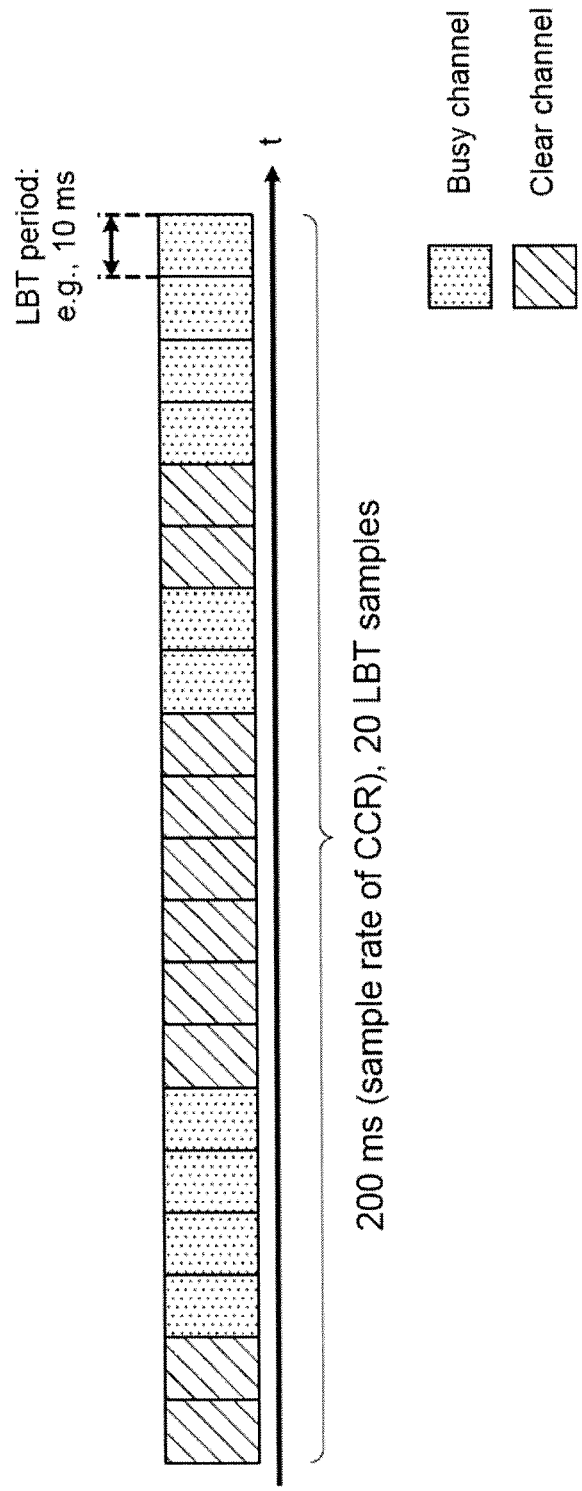
FIG. 8 is a diagram illustrating an example of CCR measurement according to the present embodiment.
Figure 9:
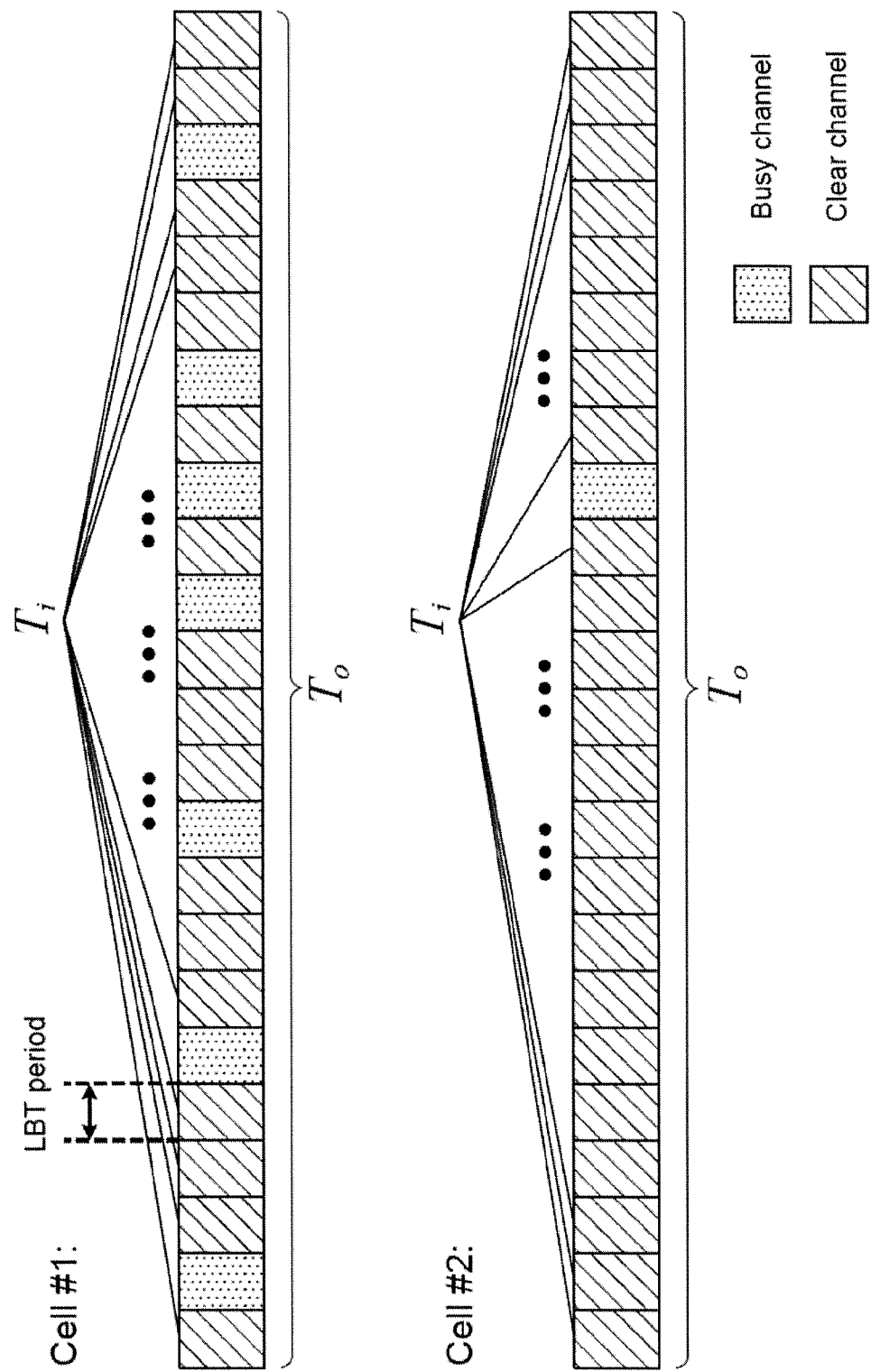
FIG. 9 is a diagram illustrating an example of CCR when LBT is always carried out in each frame.
Figure 10:
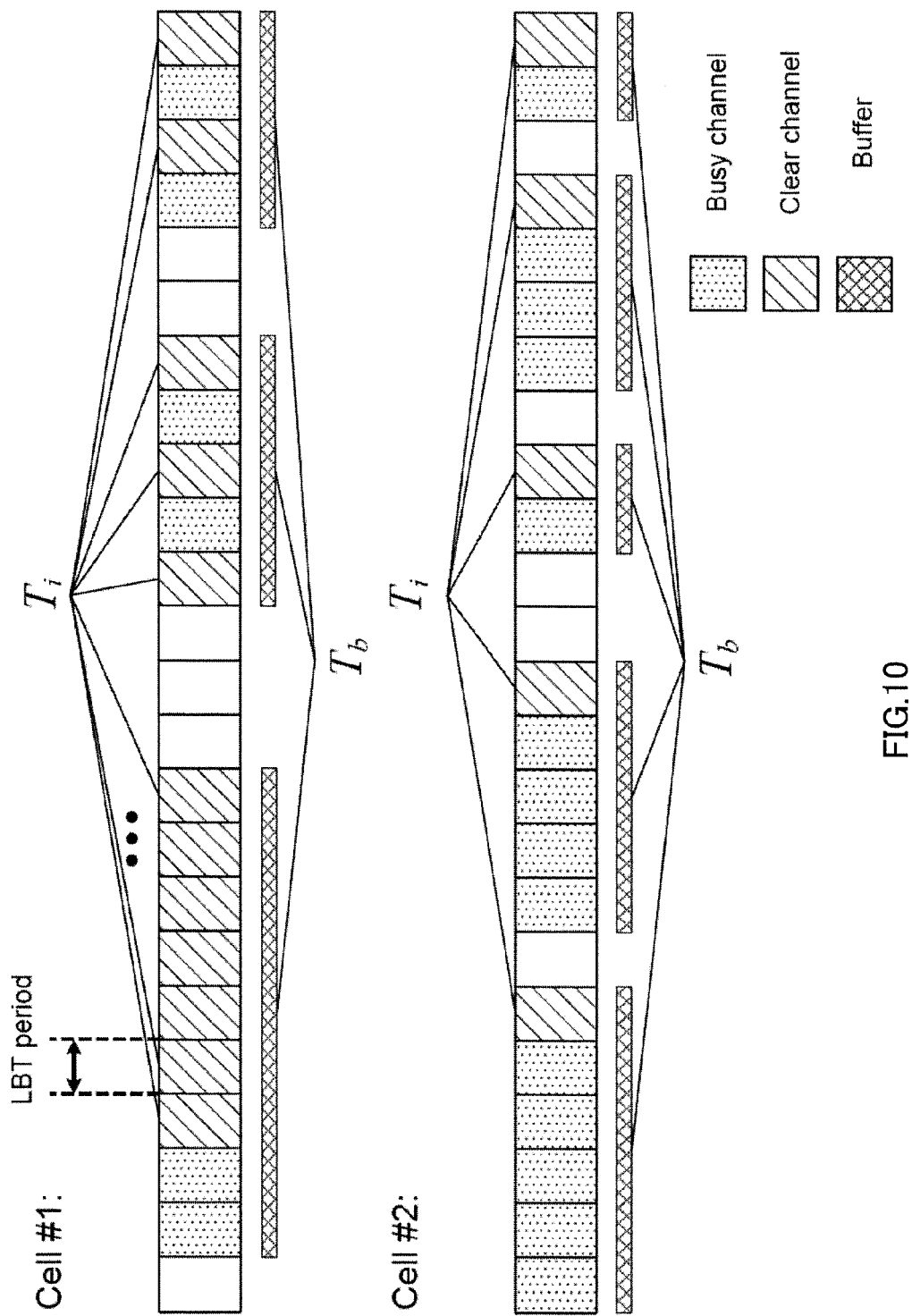
FIG. 10 is a diagram illustrating an example of CCR when LBT is not always carried out in each frame.

As mentioned above, CCR can be calculated as a rate or percentage of occupation of a channel clear time within a given time where LBT is executed. Calculation of CCR is explained in detail with reference to FIGS. 8 to 10. FIG. 8 illustrates a plurality of radio frames in a cell. FIGS. 9 and 10 illustrate a plurality of radio frames in each of two cells (Cell #1, Cell #2). FIGS. 8 to 10 illustrate the channel state (busy or clear) of each frame determined by LBT.

FIG. 8 is a diagram illustrating an example of CCR measurement according to the present embodiment. In FIG. 8, assume that the observation time (sample rate) is 200 ms, and LBT cycle is 10 ms. That is, one CCR calculation needs to be 20 LBT samples (results). In the example of FIG. 8, there are obtained 20 LBT samples from measurement results of one cell, among which 10 are samples in which channel is clear (clear samples) and 10 are samples in which channel is busy (busy samples). This is represented by CCR=10/(10+10)=0.5. That is, the percentage of available time resource amount for this cell is 50%.

FIG. 9 is a diagram illustrating an example of CCR where LBT is always executed in each frame. In the example of FIG. 9, the frame length corresponds to the LBT cycle and even when there is no data in transmission buffer, LBT is executed in each frame. Thus, LBT configuration in which LBT is executed every LBT cycle is called LBT always. As described above, LBT represents listening before signal transmission, but in this description, LBT includes the case where listening (CCA) is simply carried out.

In the case of LBT always, all the frames are to be observation time. In the example of FIG. 9, 24 frames illustrated are observation time $T_o$. On the other hand, as for the channel clear time $T_f$, Cell #1 has 17 frames and Cell #2 has 23 frames.

Accordingly, in the example of FIG. 9, CCR of Cell #1 is 17/24, CCR of Cell #2 is 23/24, and that is, Cell #2 has higher CCR. As far as there is no great difference exhibited by any other cell selection determination index such as RU, Cell #2 is selected as the best cell.

FIG. 10 is a diagram illustrating the case where LBT is not always carried out in each frame. In the example of FIG. 10, the frame length corresponds to the LBT cycle and LBT is carried out in each frame as far as there is data in a transmission buffer. Thus, if data is in the buffer, LBT is carried out every LBT cycle, but if there is no data in the buffer, LTB is not carried out. This LBT configuration is called LBT conditional. FIG. 10 illustrates frames with data in the buffer in addition to the channel state determined by the LBT. As for the frames with no data in the buffer, since LBT is not executed and the channel state is unknown.

In the case of LBT conditional, the frames with data in the buffer become the observation time. In the example illustrated in FIG. 10, out of 24 frames illustrated, the observation time $T_b$ is 18 frames for Cell #1 and 19 frames for Cell #2. The channel clear time $T_i$ is 12 frames for Cell #1 and 5 frames for Cell #2.

Accordingly, in the example of FIG. 10, CCR of Cell #1 is 12/18, CCR of Cell #2 is 5/19, and that is, Cell #1 has higher CCR. As far as there is no great difference exhibited by any other cell selection judgement index such as RU, Cell #1 is selected as the best cell.

Here, the observation time $T_o$ (24 frames in FIG. 9) and the time to determine the observation time $T_b$ (24 frames in FIG. 10) may be determined in advance to given times (for example, corresponding to the number of frames), or information about the observation time (for example, timing, cycle, period and so on) may be given to a radio base station or user terminal by higher layer signaling (for example, RRC signaling) or broadcast signals.

(Modification)

In cell selection, a CCR measurement value obtained at one observation time is not used as it is, but a given calculation result may be rather used. For example, CCR index moving average $F_n$ at n-th observation time is obtained by the following equation (4).

$$F_n = (1-a) \cdot F_{n-1} + a \cdot M_n \quad \text{Equation (4)}$$

In the equation, $M_n$ represents a CCR measurement value at the most recent (last) observation time, $F_{n-1}$ is the previous index moving average and $F_0 = M_1$. In addition, a is a CCR smoothing coefficient (filter coefficient) and for example, it may be 0.5.

Further, determination of the busy state in the observation time may be such that when reception power measured by LBT exceeds a threshold, the channel is determined to be busy, but, determination is not limited to this. For example, the busy determination may be performed in consideration of reception signal types in LBT. Specifically, if an LTE signal is identified from a reception signal, and as a result of this identification, it exceeds the above-mentioned threshold due to an LTE signal from another operator, it needs not to be determined that the channel is busy. Clear determination is possible even in an LTE-LAA system of another operator, it is possible to make active use of the unlicensed band based on the interference control means other than LBT between LTE-LAA systems and thereby improve the resource usage, throughput and so on.

Identification of the above-mentioned LTE signal may be performed by a reference signal (RS) of LTE. For example, as a reference signal, a cell-specific reference signal (CRS), synchronization signals (PSS/SSS: Primary Synchronization Signal/Secondary Synchronization Signal), positioning reference signal (PRS), demodulation reference signal (DM-RS), discovery signal (DS), channel state measurement reference signal (CSI-RS) may be used as well. Or, these signals may be used in combination (such as combination of a synchronization signal and a CSI-RS) or a new reference signal for unlicensed band (including a reference signal modified from legacy reference signals) may be used as well.

Figure 11A:
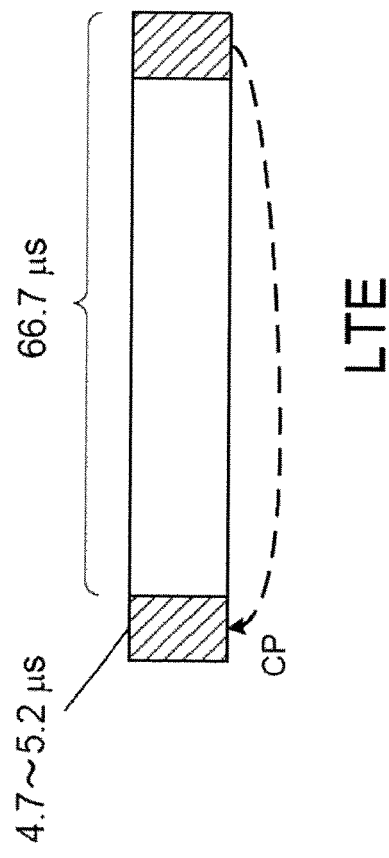
FIG. 11 provides diagrams illustrating an example of the symbol configuration of LTE and Wi-Fi.
Figure 11B:
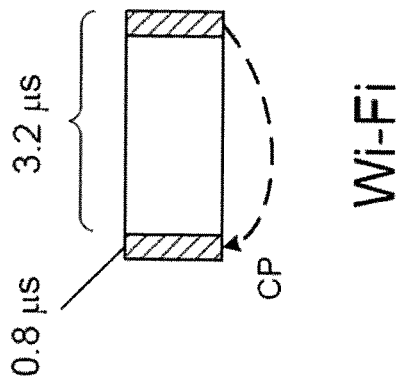

Identification of the LTE signal mentioned above may be carried out by using auto-correlation function. In both of LTE and Wi-Fi, in order to reduce influence of interference due to multipath delay, the last part of a symbol of a signal is copied and inserted to the top of the symbol as a cyclic prefix (CP). FIG. 11 provides diagrams illustrating the symbol configuration of LTE and Wi-Fi systems. FIG. 11A illustrates the LTE symbol configuration and FIG. 11B illustrates the Wi-Fi symbol configuration. As illustrated in FIG. 11, since LTE and Wi-Fi have mutually different effective symbol lengths, autocorrelation peak interval is different from that of the copy source of the CP part. Accordingly, auto-correlation matrix of a reception signal is obtained and thereby, the LTE signal can be differentiated from the Wi-Fi signal.

Here, LBT may be carried out all the LBT subframes or may be carried out in part of symbols among the LBT subframes (OFDM symbols). In addition, in order to synchronize subframes to execute LBT between cells, information about the LBT configuration may be exchanged between the cells via the backhaul link (for example, optical fiber, X2 interface or the like). Information about the LBT configuration may include, for example, information LBT timing, LBT cycle, LBT period, whether LBT always is used or not, whether LBT conditional is used or not, and so on. Further, in order to synchronize LBT timing with that of the LAA system of another operator, information about the LBT configuration as mentioned above may be given to the operator.

(CCR Measurement in Radio Base Station)

Figure 12:
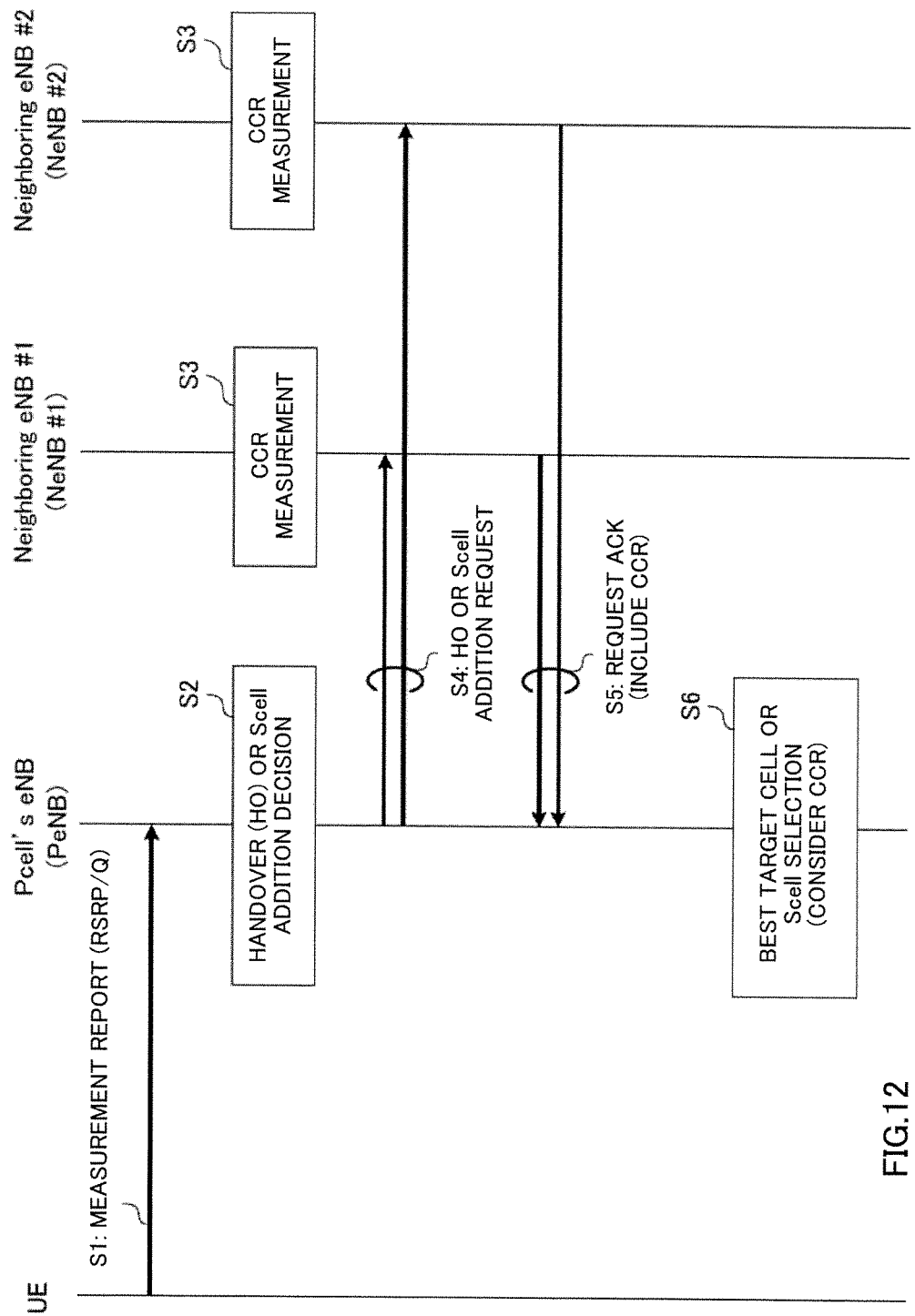
FIG. 12 is a diagram illustrating an example of the sequence of cell selection according to the present embodiment.

Next description is specifically made about an embodiment of cell selection based on CCR measurement in the radio base station. FIG. 12 is a diagram illustrating an example of sequences according to the cell selection in the present embodiment. In FIG. 12, the user terminal (UE) is connected as a primary cell to the cell of a given radio base station (PeNB) forming the licensed band and the user terminal is handovered to or connected as a secondary cell to any of two neighbor radio base stations each forming an unlicensed band (NeNB #1, #2) (SCell addition). Here, eNB as the handover source may be called source eNB or eNB as handover destination may be called target eNB.

UE transmits a measurement report to PeNB (step S1). This measurement report includes, for example, measurement results by RRM measurement (RSRP, RSRQ, etc.).

PeNB carries out determination of addition of a secondary cell or handover of an unlicensed band cell based on the measurement report (step S2). In determination, NeNB as a candidate for handover or SCell addition is selected. Candidate selection may be performed based on the measurement report, the positional information of the user terminal of NeNB and so on. For example, PeNB determines that the reception quality of a current secondary cell in the connecting UE is equal to or less than a given threshold and selects NeNB #1 and NeNB #2 as handover candidate cells. Besides, PeNB determines that reception quality of UE from NeNB #1 and NeNB #2 is equal to or greater than a given threshold, and selects NeNB #1 and NeNB #2 as SCell addition candidate cells.

On the other hand, NeNB #1 and NeNB #2 perform CCR measurement (step S3). CCR measurement may be, for example, performed when a given notification is received, or at given cycles. Or, CCR measurement may be performed at different timings by a plurality of NeNBs.

PeNB transmits a request for handover or secondary cell addition of the unlicensed band cell to the candidate cells (NeNB #1, #2) selected at step S2 (step S4). On the other hand, each NeNB having received the above-mentioned request transmits a response acknowledgement to the request (request acknowledge (ACK) including CCR measured at step S3 to PeNB (step S5). For example, the response acknowledgement may be handover request acknowledgement (Handover request acknowledge).

Note that in FIG. 12, it is configured that CCR is given in response to a handover or secondary cell addition request, but this is not intended to limit the present invention. For example, CCR may be exchanged between neighbor cells periodically. Or, CCR measurement at step S3 may be also carried out in response to the handover or secondary cell addition request.

PeNB carries out cell selection in consideration of CCR of each cell. That is, PeNB considers CCRs of respective cells and selects the best target cell from secondary cells for the handover case or selects the best secondary cell for the secondary cell addition case. Then, PeNB controls the selected cell as a connection cell for UE (step S6). Here, used as the index for selecting the best cell is, for example, the capacity C (the above-mentioned equation (2)) considering CCR. Besides, controlling the given cell (target cell) as a connecting cell includes, but is not limited to, RRC signaling including mobility control information of a target cell for UE (RRCConnectionReconfiguration) and transmitting a transfer status of discontinuous UL data to a base station forming the target cell (SN STATUS TRANSFER). (CCR Measurement at User Terminal)

Next description is made about an embodiment in which transmission is controlled based on CCR measurement at the user terminal.

Prior to explanation of this embodiment, description is made about the utility of CCR measurement at the user terminal. In the unlicensed band cell, since interference is given from a LAA system/Wi-Fi system of another operator, a plurality of user terminals even connected to the same LTE-U cell may be subjected to different levels of interference. In such a case, CCR measurement at the LTE-U base station is insufficient to obtain the available time resource amount for each user terminal accurately.

Figure 13A:
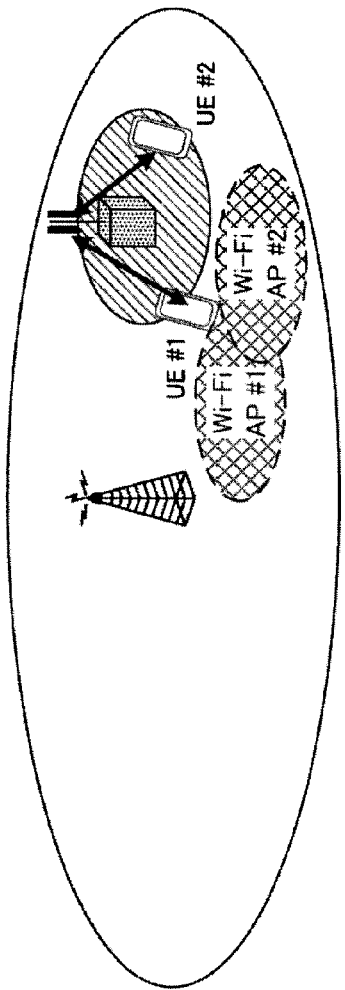
FIG. 13 provides diagrams illustrating an example of a use case of CCR according to the present embodiment.
Figure 13B:
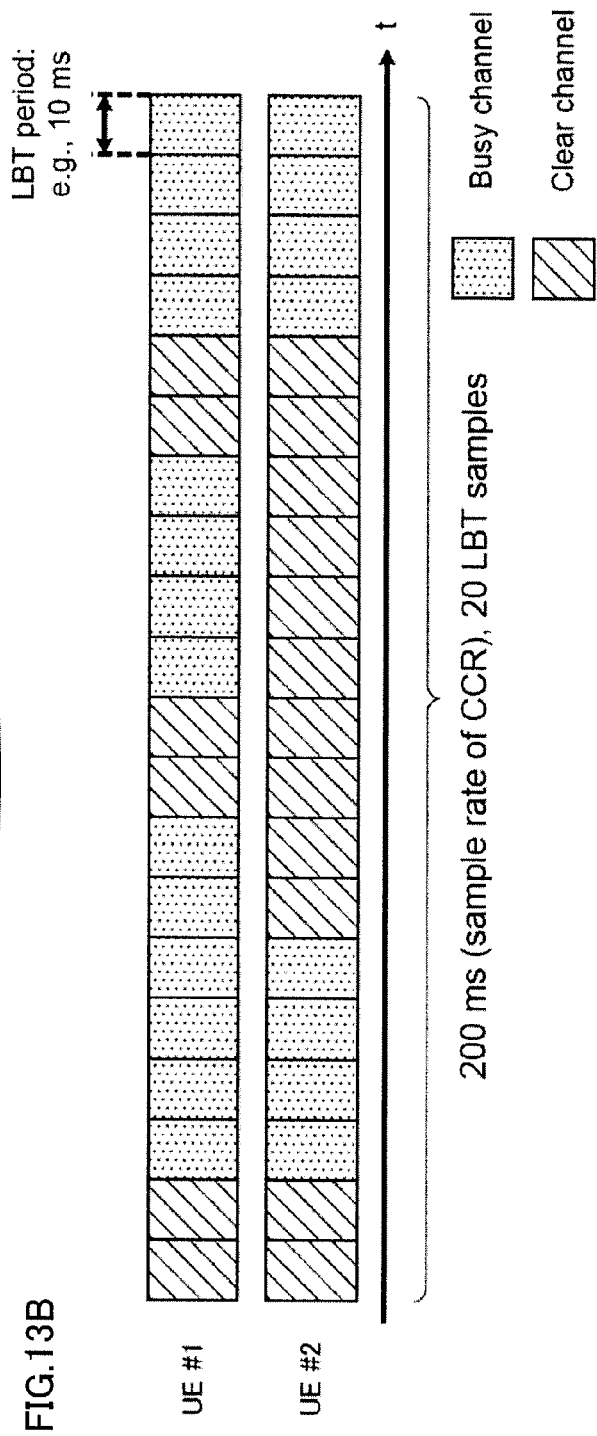

FIG. 13 provides diagrams illustrating an example of a use case of CCR according to the present embodiment. FIG. 13A is a diagram illustrating a scenario of cell arrangement. In this scenario, UE #1 and UE #2 are connected to the same LTE-U cell. In the vicinity of UE #1, two Wi-Fi access points (Wi-Di AP #1, #2) are located, while no Wi-Fi access point is located in the vicinity of UE #2.

FIG. 13 B is a diagram illustrating a CCR measurement result in each UE in the scenario of FIG. 13A. UE #1 shows lower CCR than UE #2. In this case, it is almost difficult for UE #1 to carry out transmission and it problematically takes much time before completion of data transmission. On the other hand, in CCR measurement at the LTE-U base station that communicates with UE #1 and UE #2, it is difficult to obtain a difference in CCR between UEs.

Transmission of the user terminal is carried out in accordance with reception of an uplink grant from the radio base station. Accordingly, in the present embodiment, when transmitting an uplink grant, the radio base station controls to prioritize a UE of low CCR. With this control, it is possible to transmit relatively many uplink grants to the UE of less available time resource amount and also possible to increase the transmission opportunities for the UE of low CCR.

Figure 14:
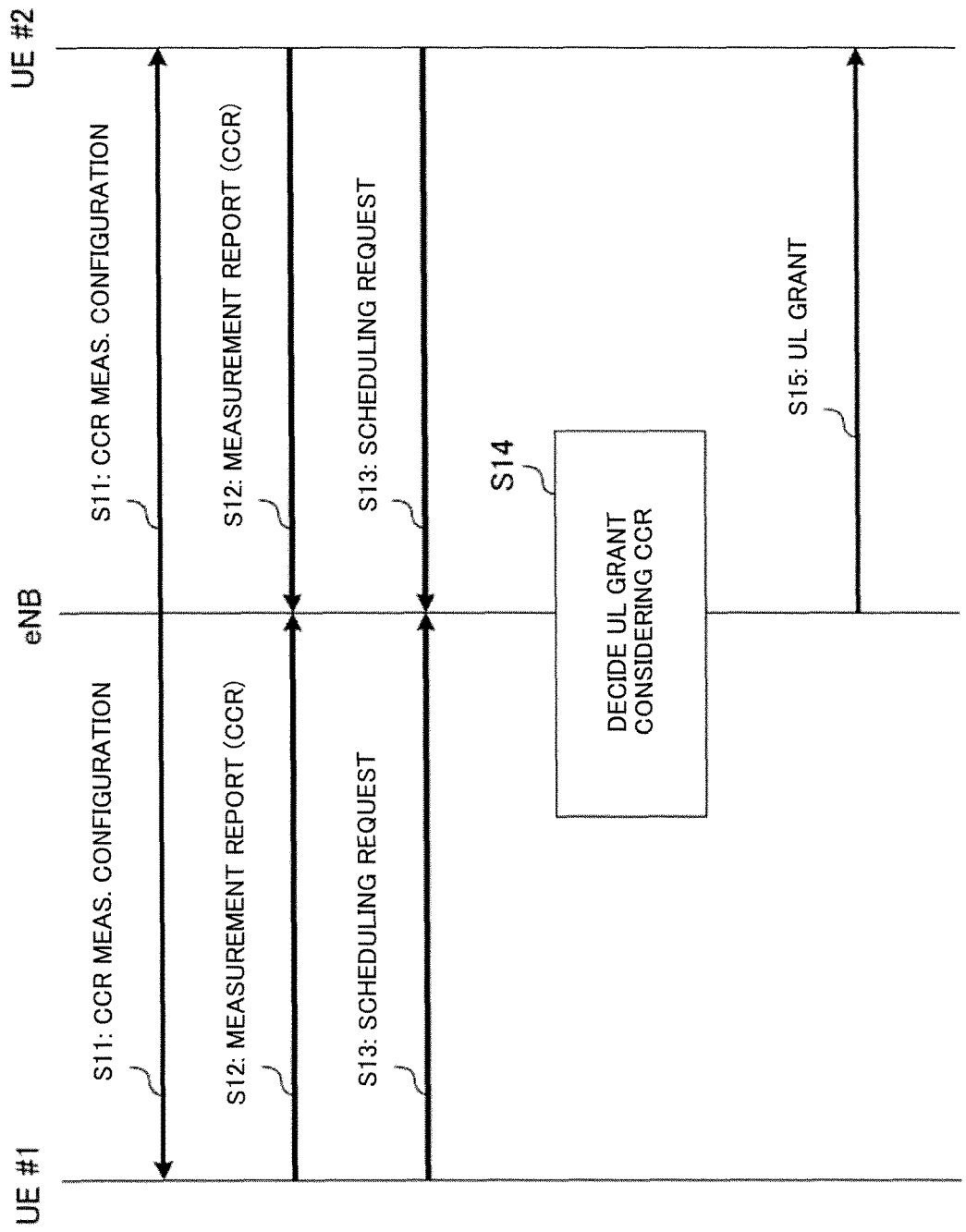
FIG. 14 is a diagram illustrating an example of the sequence of transmission control of UE according to the present embodiment.

In the present embodiment, in order to control a UE of low CCR preferentially, there are introduced CCR measurement at UE and CCR report (CCR measurement report). FIG. 14 is a diagram illustrating an example of the sequence of transmission control of a UE in the present embodiment. In FIG. 14, two user terminals (UE #1, UE #2) are illustrated as being connected to the radio base station (eNB) by the unlicensed band.

The eNB establishes a CCR measurement configuration for each UE (step S11). The CCR measurement configuration may include information indicating CCR measurement/report timing and, for example, it may include that CCR measurement and/or CCR measurement report is performed when a given condition is met (event-triggered report) or is performed periodically (periodically report). Further, the CCR measurement configuration may be made to report a plurality of CCR measurement results by one measurement report together.

Each UE transmits a feedback report (CCR measurement report) including CCR measured in accordance with the CCR measurement report configured in the step S11 in a (step S12). Note that the CCR measurement report may be transmitted to the eNB directly by the unlicensed band or may be transmitted to another eNB by a licensed band and then to the eNB via the backhaul link (for example, optical fiber, X2 interface or the like).

Further, when there is transmission data, each UE transmits a scheduling request to eNB (step S13).

The eNB determines UE as a transmission target of an uplink grant in consideration of CCRs of respective UEs (step S14). For example, the eNB counts transmission of an uplink grant during a given period for each UE and controls to transmit more UL grants to UE of low CCR than to UE of high CCR.

The eNB transmits an uplink grant to UE as a transmission target determined in step S14 (step S15).
(Difference Between CCR and Existing Signaling of LTE System)

In the conventional LTE system, the following signaling is used for interference control between a radio base station and a user terminal or between radio base stations. Channel quality information (CQI: Chanel Quality Indicator) is used to report channel reception quality (for example, SIR (Signal-to-Interference Ratio). HII (High Interference Indicator) is used to transmit assignment resources to a cell-edge UE in a cell. OI (Overload Indicator) is used to transmit resources subjected to high interference.

On the other hand, CCR according to the present invention is used to report the percentage of available time resources. As described above, the Wi-Fi system uses the entire band, and therefore, interference from the Wi-Fi system is expressed by either "with interference (interference to whole the bandwidth)" or "without interference (no interference in whole the bandwidth). In the LAA system side, it is important how long the determination "without interference" is made based on LBT.

If the determination "with interference" is made, transmission is not enabled. Accordingly, the interference amount (how much interference is) does not matter. In other words, in the LAA system, it is preferable to know the time "without interference" by CCR and to control a connection cell selection of the user terminal. The time is not able to be obtained by signaling of the conventional LTE system such as CQI, HII or OI.

When the determination "without interference" is made, it is important to know the level of reception quality, but this can be obtained by RSRP/RSRQ or CQI.

In the above-mentioned embodiments, it is assumed that the information about available time resource amount in the unlicensed band is CCR, but it is not intended to limit the present invention. For example, the information about available time resource amount may be another indicator that is determined based on an LBT result.

(Configuration of Radio Communication System)

Next description is made about the configuration of a radio communication system according to the present embodiment.

Figure 15:
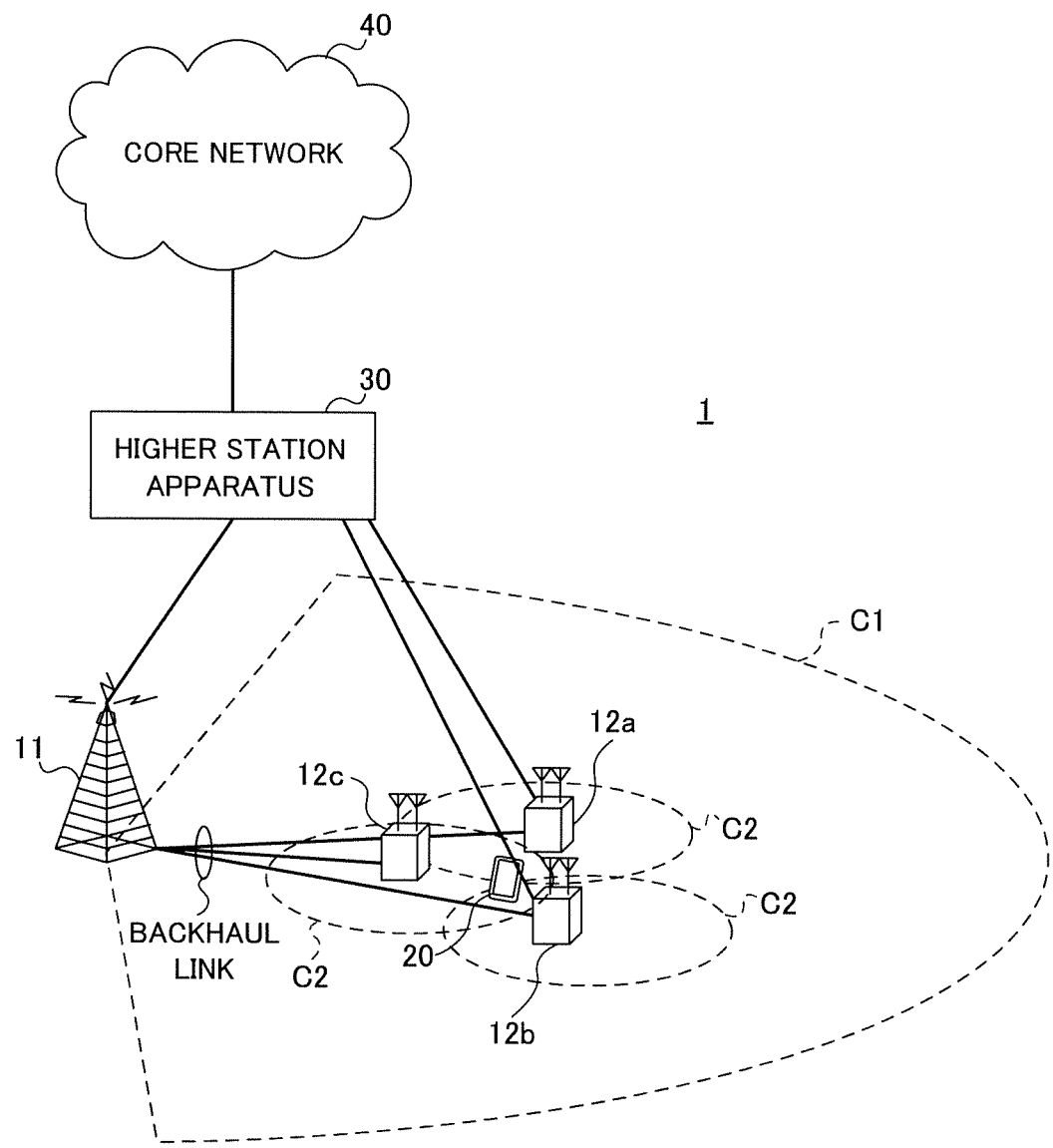
FIG. 15 is a diagram schematically illustrating an example of the configuration of a radio communication system according to an embodiment of the present invention.

FIG. 15 is a diagram schematically illustrating the configuration of a radio communication system according to an embodiment of the present invention. The radio communication system illustrated in FIG. 15 is, for example, a system covering an LTE system, SUPER 3G. In this radio communication system, carrier aggregation (CA) and/or dual connectivity (DC) applies by aggregating a plurality of fundamental frequency blocks (component carriers), each component carrier corresponding to the system bandwidth of the LTE system. Besides, the radio communication system illustrated in FIG. 15 has an unlicensed band (LTE-U base station). This radio communication system may be called IMT-Advanced, 4G, FRA (Future Radio Access) or the like.

The radio communication system 1 illustrated in FIG. 15 has a radio base station 11 forming a macro cell C1 and radio base stations 12a to 12c each forming a small cell C2 that is smaller than the macro cell C1 and is located within the macro cell C1. In the macro cell C1 and the small cells C2, a user terminal 20 is located. For example, it can be configured that the macro cell C1 is used with a licensed band, each small cell C2 is used with an unlicensed band (LTE-U). It can be also configured that a part of the small cells is used with a licensed band and the other is used with an unlicensed band.

The user terminal 20 is able to be connected to both of the radio base station 11 and the radio base stations 12. The user terminal 20 is expected to use the macro cell C1 and small cell C2 of different frequencies simultaneously by CA or DC. For example, the radio base station 11 using the licensed band may transmit assist information (DL signal configuration) about the radio base station 12 (for example, LTE-U base station) using the unlicensed band to the user terminal 20. Further, when CA is carried out with the licensed and unlicensed bands, one radio base station (for example, radio base station 11) may be configured to control scheduling of the licensed and unlicensed band cells.

The user terminal 20 and the radio base station 11 are able to perform communication using a carrier of relatively low frequency band (for example, 2 GHz) and narrow bandwidth (called legacy carrier). On the other hand, the user terminal 20 and the radio base station 12 are able to perform communication using a carrier of relatively high frequency band (for example, 3.5 GHz, 5 GHz or the like) and wide bandwidth or using the same carrier as that used in communication between the user terminal and the radio base station 11. Connection between the radio base station 11 and the radio base station 12 (or between two radio base stations 12) may be wired connection (optical fiber, X2 interface or the like) or wireless communication.

The radio base station 11 and radio base stations 12 are each connected to a higher station apparatus 30 and also connected to a core network 40 via the higher station apparatus 30. The higher station apparatus 30 includes, but is not limited to, for example, an access gateway apparatus, a radio network controller (RNC), mobility management entity (MME) and so on. Each radio base station 12 may be connected to the higher station apparatus 30 via the radio base station 11.

Each radio base station 11 is a radio base station having a relatively wide coverage and may be called a macro base station, aggregator node eNB (eNodeB), transmission/reception point or the like. The radio base station 12 is a radio base station having a local coverage and may be called a small base station, a micro base station, a pico base station, a femto base station, HeNB (Home eNodeB), RRH (Remote Radio Head), transmission/reception point, or the like. In the following description, the radio base stations 11 and 12 are collectively called radio base stations 10, unless they are distinguished from each other. Each user terminal 20 is a terminal supporting various communication schemes of LTE, LTE-A and the like, and may include not only a mobile communication terminal, but also a fixed communication terminal.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals. Note that this combination of uplink and downlink radio access schemes is not intended to restrict the present invention.

In the radio communication system 1, downlink channels as used include a downlink shared channel (PDSCH: Physical Downlink Shared Channel) used by each user terminal 20 on a shared basis, a broadcast channel (PBCH: Physical Broadcast Channel), a downlink L1/L2 control channel and so on. PDSCH is used to transmit user data, higher layer control information, given SIB (System Information Block). PACH is used to transmit MIB (Master Information Block) and so on.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. The PDCCH is used to transmit downlink control information (DCI) including scheduling information of PDSCH and PUSCH, and so on. PCFICH is used to transmit OFDM symbols used by PDCCH. The PHICH is used to transmit HARQ transmission acknowledgement signal (ACK/NACK) in response to PUSCH. The EPDCCH is frequency-division-multiplexed with PDSCH (downlink shared data channel) to transmit DCI like PDCCH.

In the radio communication system 1, the uplink channels include a PUSCH (Physical Uplink Shared Channel), which is an uplink data channel used by each user terminal 20 on a shared basis, and a PUCCH (Physical Uplink Control Channel) and a random access channel (PRACH: Physical Random Access Channel). The PUSCH is used to transmit user data and higher layer control information. The PUCCH is used to transmit downlink radio quality information (CQI: Channel Quality Indicator), ACK/NACK, and so on. The PRACH is used to transmit a random access preamble (RA preamble) to establish connection with a cell.

Figure 16:
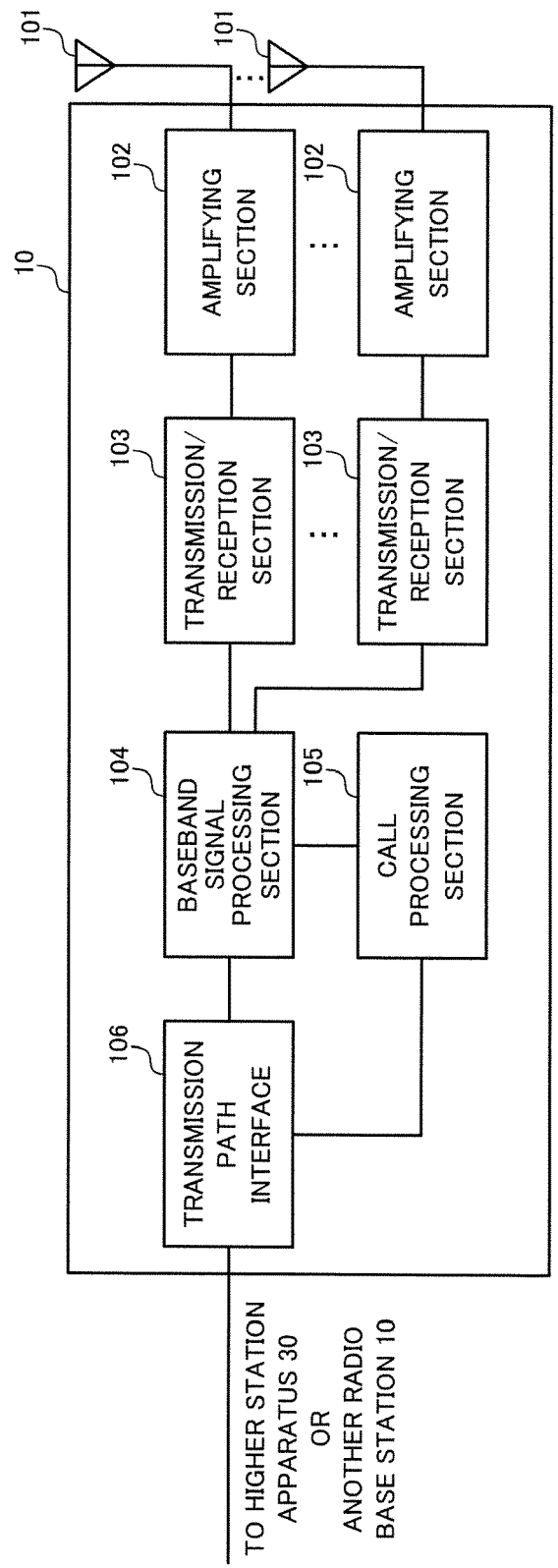
FIG. 16 is a diagram schematically illustrating an example of the overall configuration of a radio base station according to an embodiment of the present invention.

FIG. 16 is a diagram of an overall configuration of the radio base station 10 (including the radio base stations 11 and 12) according to the present embodiment. The radio base station 10 has a plurality of transmission/reception antennas 101 for MIMO transmission, amplifying sections 102, transmission/reception sections 103, a baseband signal processing section 104, a call processing section 105 and a transmission path interface 106. Each transmission/reception section may consist of a transmission section and a reception section.

User data that is transmitted on the downlink from the radio base station 10 to the user terminal 20 is input from the higher station apparatus 30, through the transmission path interface 106, into the baseband signal processing section 104.

In the baseband signal processing section 104, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing. Then, the resultant signals are transferred to each transmission/reception section 103. As for downlink control signals, transmission processing is performed, including channel coding and inverse fast Fourier transform, and the resultant signals are transmitted to each transmission/reception section 103.

Also, the baseband signal processing section 104 transmits, to each user terminal 20, control information for communication in the cell by higher layer signaling (for example, RRC signaling, broadcast information or the like). Information for communication in the cell includes, for example, uplink system bandwidth, downlink system bandwidth and so on.

Further, in the licensed band, the radio base station (for example, radio base station 11) may transmit, to the user terminal 20, assist information about the unlicensed band communication (for example, DL TPC information or the like).

In each transmission/reception section 103, baseband signals which are precoded per antenna and output from the baseband signal processing section 104 are subjected to frequency conversion processing into a radio frequency band. The radio frequency signals having been subjected to frequency conversion at the transmission/reception section 103 are amplified by the amplifying section 102, and the resultant signals are transmitted from the transmission/reception antenna 101. The transmission/reception section 103 may be configured of a transmitter/receiver, transmission/reception circuit or transmission/reception apparatus that is explained based on common knowledge in the technical field to which the present invention pertains.

Meanwhile, as for uplink signals, radio frequency signals are received in each transmission/reception antenna 101, and amplified in the amplifying section 102. The uplink signals amplified in the amplifying section 102 are received by the transmission/reception section 103. In the transmission/reception section 103, reception signals are subjected to frequency conversion and converted into baseband signals, and are input to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on the user data included in the received uplink signals. Then, the resultant signals are transferred to the higher station apparatus 30 through the transmission path interface 106. The call processing section 105 performs call processing such as setting up and releasing a communication channel, manages the state of the radio base station 10 and manages the radio resources.

The transmission path interface 106 transmits and receives signals to and from the higher station apparatus 30 via given interface. The transmission path interface 106 may perform transmission and reception of signals with a neighbor radio base station via inter-base station interface (for example, optical fiber, X2 interface) (backhaul signaling). For example, the transmission path interface 106 may perform transmission and reception of information about the available time resource amount (for example, CCR) with a neighbor radio base station.

Figure 17:
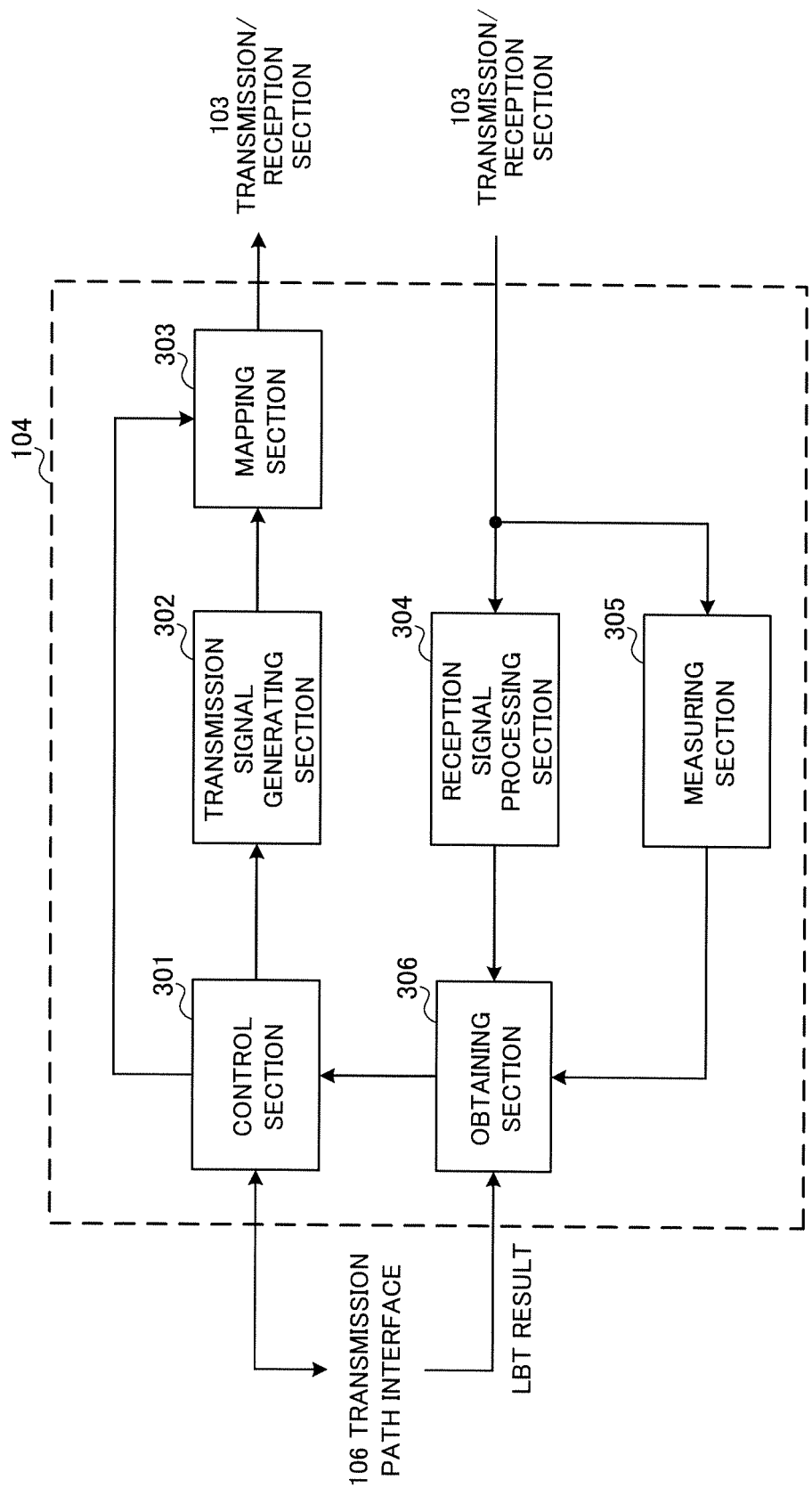
FIG. 17 is a diagram schematically illustrating an example of the functional configuration of the radio base station according to an embodiment of the present invention.

FIG. 17 is a diagram illustrating a functional structure of the baseband signal processing section 104 of the radio base station 10 according to the present embodiment. The functional structure in FIG. 17 is mainly of featuring parts according to the present embodiment, however the radio base station 10 may also have other functional blocks required for radio communication.

As illustrated in FIG. 17, the radio base station 10 (including the radio base station 11 and radio base station 12) is configured to include a control section (scheduler) 301, a transmission signal generating section 302, a mapping section 303, a reception signal processing section 304, a measuring section 305 and an obtaining section 306. According to the present embodiment, the radio base station 11 is configured to use the licensed band and the radio base station 12 is configured to use the unlicensed band. In this case, the radio base station 11 does not need to have the measuring section 305, and in the radio base station 12, the obtaining section 306 may not obtain LBT results via the transmission path interface 106. The licensed band/unlicensed band used by each radio base station are not limited to those in the above-mentioned configuration.

The control section (scheduler) 301 controls scheduling of downlink data signals to be transmitted by PDSCH and downlink control signals that are transmitted by PDCCH and/or enhanced PDCCH (EPDCCH). Besides, the control section controls scheduling of downlink reference signals such as system information, synchronization signals, CRS and CSI-RS. The control section also controls scheduling of uplink reference signals, uplink data signals to be transmitted in PUSCH, uplink control signals to be transmitted in PUCCH and/or PUSCH, RA preamble to be transmitted in PRACH and so on. When the licensed band and the unlicensed band are scheduled by one control section (scheduler) 301, the control section 301 controls communication of the licensed band cell and the unlicensed band cell (for example, controls resource allocation). The control section 301 may be a controller, a control circuit or a control device that is explained based on common recognition in the technical field to which the present invention pertains.

Further, the control section 301 controls communication of the use terminal 20 in the unlicensed band based on information about the available time resource amount (for example, CCR) input from the obtaining section 306. Here, communication control by the control section 301 depends on whether the radio base station 10 provided with the control section 301 is the radio base station 11 using the licensed band or the radio base station 12 using the unlicensed band. The radio base station 11 executes control of handover or secondary cell addition of the unlicensed band and the radio base station 12 executes transmission control of UL grant of the unlicensed band to the user terminal 20.

For example, in the radio base station 11, when the obtaining section 306 obtains CCR from notification of the radio base station 12 (LTE-U base station) using the unlicensed band via the transmission path interface 106, the control section 301 is able to control the radio base station 12 as the connection cell of the user terminal 20 based on CCR (embodiment of CCR measurement in the radio base station). In this case, the control section 301 selects the unlicensed band cell as a target of handover or secondary cell selection in consideration of the CCR of each cell obtained from the plurality of radio base stations 12. Here, selection index as used may be, for example, the capacity C in consideration of CCR (the above-mentioned equation (2)).

Further, in the radio base station 12, the control section 301 may control to transmit the information about available time resource amount (for example, CCR) to another radio base station 10 (for example, radio base station 11 using the licensed band) via the transmission path interface 106. This transmission may be performed periodically or may be included in a response to the handover/secondary cell addition request.

Furthermore, in the radio base station 12, when the obtaining section 306 obtains CCR from a feedback report (CCR measurement report) of the user terminal 20 using the unlicensed band via the reception signal processing section 304, the control section 301 is able to control whether or not to transmit UL grant to the user terminal 20 based on CCR (Embodiment of CCR Measurement by User Terminal). In this case, the control section 301 controls to transmit UL grant to a user terminal of low CCR preferentially in consideration of obtained CCRs of a plurality of user terminals 20.

In addition, in the radio base station 12, the control section 301 may control to transmit information about LBT timing and/or transmission timing of a feedback report to the user terminal 20 via the transmission/reception section 103. This information may be controlled in the radio base station 11 in the same manner as the case of transmission in the licensed band.

The transmission signal generating section 302 generates DL signals (downlink control signals, downlink data signals, downlink reference signals and so on) based on an instruction from the control section 301 and outputs the signals to the mapping section 303. For example, the transmission signal generating section 302 generates a DL assignment to transmit assignment information of downlink signals and a UL grant to transmit assignment information of uplink signals based on an instruction from the control section 301. The downlink data signals are subjected to coding processing and modulation processing with a coding rate and a modulation scheme that are determined based on CSI from each user terminal 20. The transmission signal generating section 302 may include information about a measurement instruction in the unlicensed band and/or feedback instruction of measurement results in downlink control signals. The transmission signal generating section 302 may be configured of a signal generator or a signal generating circuit explained based on common knowledge in the technical field to which the present invention pertains.

The mapping section 303 maps downlink signals generated by the transmission signal generating section 302 to radio resources based on an instruction from the control section 301 and outputs the signals to the transmission/reception section 303. The mapping section 303 may be configured of a mapping circuit or a mapper explained based on common knowledge in the technical field to which the present invention pertains.

The reception signal processing section 304 performs reception processing (for example, demapping, demodulation and decoding) on UL signals transmitted form the user terminal (for example, transmission acknowledgement signals (HARQ-ACK), data signals transmitted in the PUSCH). The processing results may be output to the control section 301. When detecting a feedback report (CCR measurement report) transmitted from the user terminal 20, the reception signal processing section 304 outputs it to the obtaining section 306. The reception signal processing section 304 may be configured of a signal processor or a signal processing circuit explained based on common knowledge in the technical field to which the present invention pertains.

The measuring section 305 measures reception power (RSRP) or a channel state by using a received signal. In the radio base station 12, the measuring section 305 carries out LBT in the unlicensed band and outputs a LBT result (for example, a determination result whether the channel state is clear or busy) to the obtaining section 306. The measuring section 305 may be configured of a measurement unit or a measurement circuit explained based on common knowledge in the technical field to which the present invention pertains.

The obtaining section 306 obtains information about available time resource amount. For example, in the radio base station 11, the obtaining section 306 obtains CCR from transmission from the radio base station 12 (LTE-U base station) via the transmission path interface 106. In addition, in the radio base station 12, the obtaining section 306 obtains CCR from a measurement result (CCR measurement report) fed back from the user terminal 20. The obtaining section 306 may obtain CCR based on an LBT result carried out in the measuring section 305 of its own radio base station. The obtaining section 306 may be configured of an operating unit/computer or an operating or computing circuit explained based on common knowledge in the technical field to which the present invention pertains.

Figure 18:
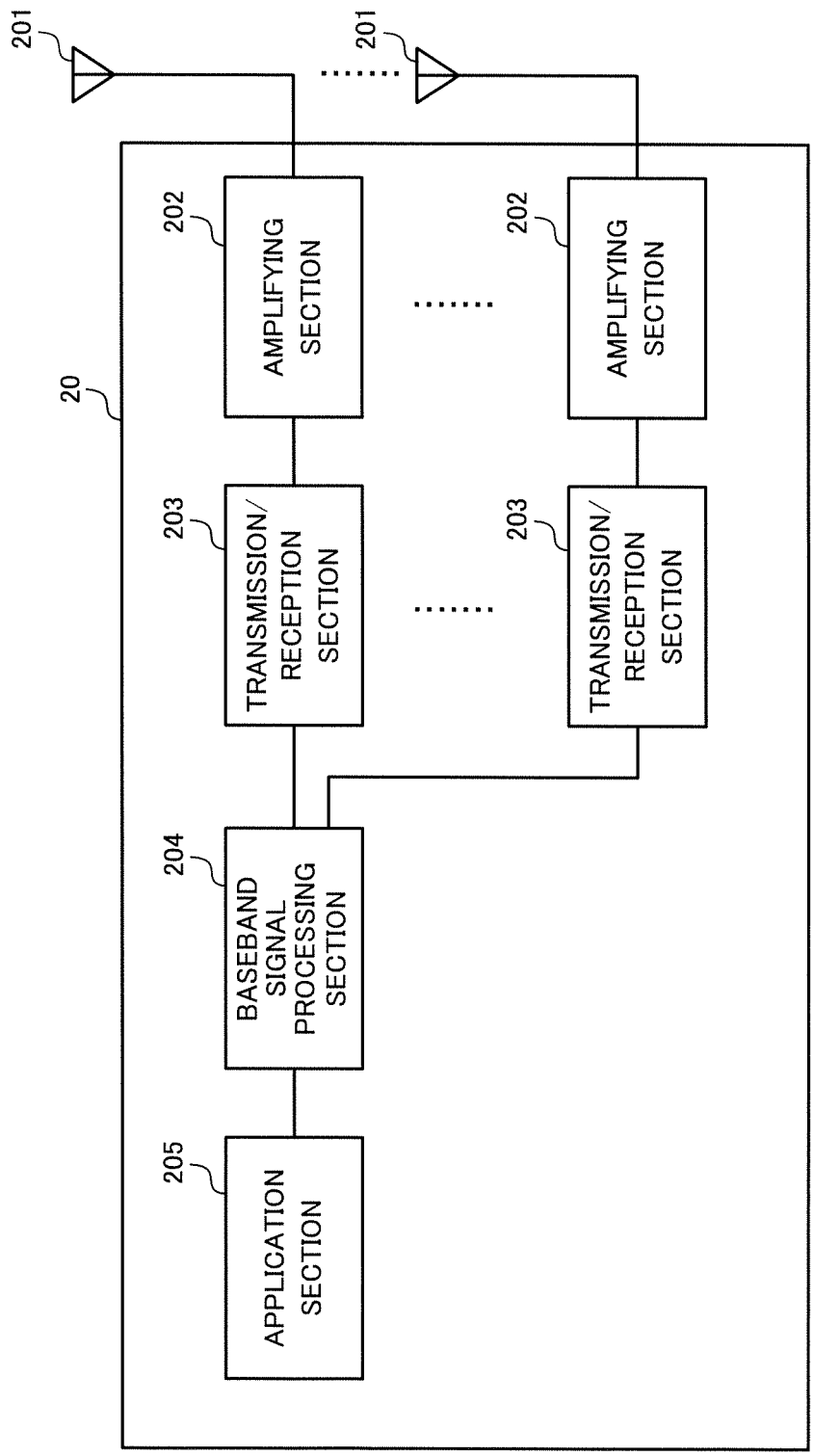
FIG. 18 is a diagram schematically illustrating an example of the overall configuration of a user terminal according to an embodiment of the present invention.

FIG. 18 is a diagram of an overall configuration of the user terminal 20 according to the present embodiment. The user terminal 20 has a plurality of transmission/reception antennas 201 for MIMO transmission, amplifying sections 202, transmission/reception sections 203, a baseband signal processing section 204 and an application section 205. Each transmission/reception section may be configured of a transmission section and a reception section.

Radio frequency signals are received in the transmission/reception antennas 201 and are amplified in the respective amplifying sections 202, and subjected to frequency conversion into baseband signals in the transmission/reception sections 203. The converted baseband signals are outputs to the baseband signal processing section 204. Each transmission/reception section may be configured of a transmitter/receiver, transmission/reception circuit or a transmission/reception device explained based on common knowledge in the technical field to which the present invention pertains. Each transmission/reception section 203 is able to transmit/receive DL/UL signals in the licensed band and unlicensed band.

The baseband signal processing section 204 performs reception processing such as FFT processing, error correction decoding and retransmission control and the like on the received baseband signals. Downlink user data is transferred to the application section 205. The application section 205 performs processing related to higher layers above the physical layer and the MAC layer. In the downlink data, broadcast information is also transferred to the application section 205.

On the other hand, uplink user data is input from the application section 205 to the baseband signal processing section 204. In the baseband signal processing section 204, retransmission control (H-ARQ: Hybrid ARQ) transmission processing, channel coding, precoding, DFT processing, DFT (Discrete Fourier Transform) processing, IFFT processing and so on are performed, and the resultant signals are transferred to each transmission/reception section 203. In the transmission/reception section 203, the baseband signals output from the baseband signal processing section 204 are converted into a radio frequency band. After that, the frequency-converted radio frequency signals are amplified in the amplifying section 202, and then, transmitted from the transmission/reception antenna 201.

Figure 19:
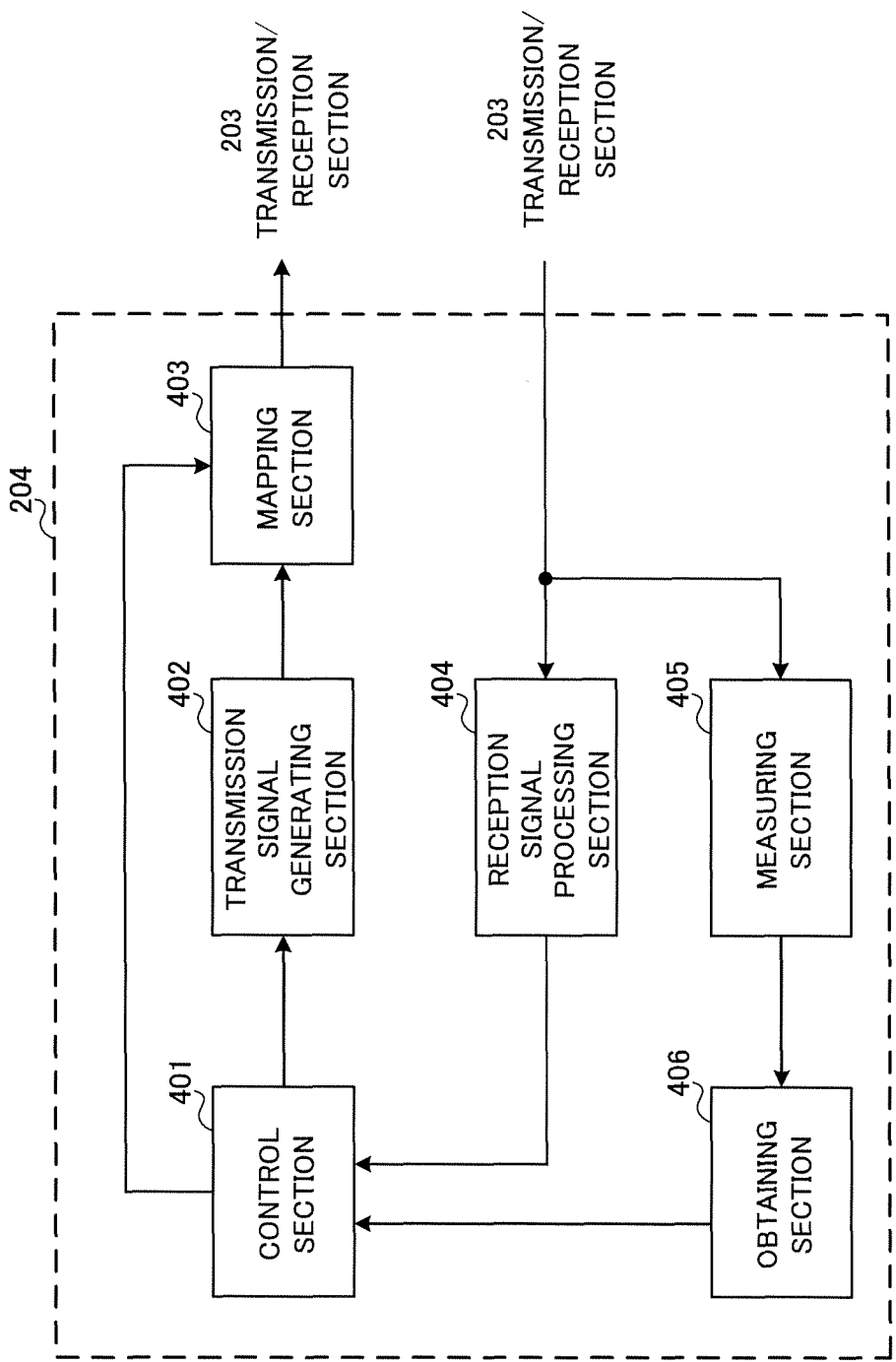
FIG. 19 is a diagram schematically illustrating an example of the functional configuration of the user terminal according to an embodiment of the present invention.

FIG. 19 is a diagram illustrating a functional structure of the baseband signal processing section 204 of the user terminal 20. The functional structure in FIG. 19 is mainly of featuring parts according to the present embodiment, and the user terminal 20 may also have other functional blocks required for radio communication.

As illustrated in FIG. 19, the baseband signal processing section of the user terminal 20 has a control section 401, a transmission signal generating section 402, a mapping section 403, a reception signal processing section 404, a measuring section 405 and an obtaining section 406.

The control section 401 obtains, from the reception signal processing section 404, downlink control signals (signals transmitted in PDCCH/EPDCCH) transmitted from the radio base station 10 and downlink data signals (signals transmitted in PDSCH) transmitted from the radio base station 10. The control section 401 controls generation of an uplink control signal (for example, transmission acknowledgement signal (HARQ-ACK) and so on) and an uplink data signal. Specifically, the control section 401 performs controls of the transmission signal generating section 402 and the mapping section 403. The control section 401 may be configured of a controller, a control circuit or a control device explained based on common knowledge in the technical field to which the present invention pertains.

In addition, the control section 401 controls to include information about the available time resource amount (for example, CCR) obtained in the obtaining section 406 in a feedback report (CCR measurement) and to transmit it to the radio base station 10.

The transmission signal generating section 402 generates UL signals (uplink control signals, uplink data signals, uplink reference signals and so on) based on an instruction from the control section 401 and output them to the mapping section 403. For example, the transmission signal generating section 402 generates an uplink control signal such as a transmission acknowledgement signal (HARQ-ACK), channel state information (CSI) and so on. Besides, the transmission signal generating section 402 generates an uplink data signal based on an instruction from the control section 401. For example, when an UL grant is included in a downlink control signal given from the radio base station 10, the control section 401 instructs the transmission signal generating section 402 to generate an uplink data signal. The transmission signal generating section 402 may be configured of a signal generating unit or a signal generating circuit explained based on common knowledge in the technical field to which the present invention pertains.

The mapping section 403 maps uplink signals generated in the transmission signal generating section 402 to radio resources based on an instruction from the control section 401, and outputs them to the transmission/reception sections 203. The mapping section 403 may be configured of a mapping circuit or a mapper explained based on common knowledge to which the present invention pertains.

The reception signal processing section 404 performs reception processing (for example, demapping, demodulation, decoding and so on) on DL signals transmitted in the licensed band and unlicensed band (for example, downlink control signals transmitted from the radio base station and downlink data signals in PDSCH transmitted from the radio base station). Here, the processing result may be output to the control section 401. The reception signal processing section 404 may be a signal processing unit or a signal processing circuit explained based on common knowledge in the technical field to which the present invention pertains.

The measuring section 405 measures reception power (RSRP) or a channel state by using the received signal. In addition, the measuring section 405 executes an LBT with the unlicensed band and outputs an LBT result (for example, a determination result whether the channel state is clear or busy) to the obtaining section 406. The measuring section 405 may be configured of a measuring unit or a measuring circuit explained based on common knowledge in the technical field to which the present invention pertains.

The obtaining section 406 obtains information about the available time resource amount and output it to the control section 401. For example, the obtaining section 406 obtains a CCR using an LBT result executed in the measuring section 405. The obtaining section 406 may be configured of an operating unit/computer or an operating or computing circuit explained based on common knowledge in the technical field to which the present invention pertains.

The block diagrams used for explaining the above-mentioned embodiments show blocks provided for the respective functions. These functional blocks (structural parts) are realized by any combination of hardware and software. Further, each functional block may be realized by any method. That is, each functional block may be realized by one physically connected device or a plurality of devices connected wiredly or wirelessly.

For example, a part or all of functions of the radio base station 10 and the user terminal 20 may be realized by using hardware such as ASIC (Application Specific Integrated Circuit), PLD (Programmable Logic Device), FPGA (Field Programmable Gate Array). In addition, the radio base station 10 and the user terminal 20 may be realized by any computer device including a processor (CPU), a communication interface for network connection, a memory, and a program-stored computer readable storage medium.

Here, the processor, the memory and other devices are connected by bus. Besides, the computer readable storage medium is, for example, a flexible disk, a magnetic optical disk, a ROM, an EPROM, a CD-ROM, a RAM, a hard disk, or any other storing medium. Further, the program may be transmitted from the network via the electric communication line. Furthermore, the radio base station 10 and the user terminal 20 may include an input device such as an input key and an output device such as a display.

The functional configurations of the radio base station 10 and the user terminal 20 may be realized by the above-mentioned hardware or by software module executed by the processor or by using the hardware and software module in combination. The processor controls the user terminal entirely by operating the operating system. The processor reads out a program, software module and data from the storage medium into the memory and executes various processes in accordance with them. This program may be a program to execute each operation explained in each embodiment mentioned above by the computer. For example, the control section 401 of the user terminal 20 may be stored in the memory to be executed by a control program controlled by a processor or the other functional blocks may be also executed in the same manner.

Now, although the present invention has been described in detail with reference to the above embodiment, it should be obvious to a person skilled in the art that the present invention is by no means limited to the embodiments described herein. For example, the above-described embodiments may be implemented alone or in combination. The present invention can be implemented with various corrections and in various modifications, without departing from the spirit and scope of the present invention defined by the recitations of the claims. Consequently, the descriptions herein are provided for the illustrative purpose only, and should by no means be construed to limit the present invention in any way.

The disclosure of Japanese Patent Application No. 2014-143510 filed on Jul. 11, 2014, including the specification, drawings, and abstract, is incorporated herein by reference in its entirety.

The invention claimed is:

1. A user terminal comprising:
a processor and a memory, wherein the processor:
measures reception power,
determines information about a percentage of channel occupancy time in a given time interval based on a measurement result of the reception power, and
controls to transmit a feedback report including the information about the percentage of channel occupancy time,
wherein the processor determines the given time interval based on information about the given time interval provided by higher layer signaling, and
wherein the processor determines the percentage of channel occupancy time based on a number of measurement results that are beyond a given threshold among a plurality of measurement results of the reception power in the given time interval.

2. A radio communication method for a user terminal, comprising:
measuring reception power;
determining information about a percentage of channel occupancy time in a given time interval based on a measurement result of the reception power; and
controlling to transmit a feedback report including the information about the percentage of channel occupancy time,
wherein the given time interval is determined based on information about the given time interval provided by higher layer signaling, and
wherein the percentage of channel occupancy time is determined based on a number of measurement results that are beyond a given threshold among a plurality of measurement results of the reception power in the given time interval.

3. A radio communication system comprising:
a user terminal that determines information about a percentage of channel occupancy time in a given time interval based on a measurement result of reception power; and
a radio base station that:
transmits information about the given time interval to the user terminal by higher layer signaling, and
receives the information about the percentage of channel occupancy time from the user terminal,
wherein the user terminal determines the given time interval based on information about the given time interval provided by higher layer signaling, and
wherein the user terminal determines the percentage of channel occupancy time based on a number of measurement results that are beyond a given threshold among a plurality of measurement results of the reception power in the given time interval.

* * * * *